(12) United States Patent
Satoh et al.

(10) Patent No.: US 7,046,204 B2
(45) Date of Patent: May 16, 2006

(54) COMMUNICATION TERMINAL

(75) Inventors: Noriyoshi Satoh, Yokohama (JP); Kenichi Sato, Sendai (JP); Yasunori Komukai, Sendai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/529,918

(22) PCT Filed: Aug. 28, 2003

(86) PCT No.: PCT/JP03/10972

§ 371 (c)(1),
(2), (4) Date: Apr. 1, 2005

(87) PCT Pub. No.: WO2004/034681

PCT Pub. Date: Apr. 22, 2004

(65) Prior Publication Data

US 2006/0055607 A1    Mar. 16, 2006

(30) Foreign Application Priority Data

Oct. 9, 2002    (JP) ............................ 2002-296520

(51) Int. Cl.
*H01Q 1/24* (2006.01)
(52) U.S. Cl. .................. 343/702; 343/906; 379/433.13
(58) Field of Classification Search ................ 343/702, 343/906; 361/724; 379/433.01, 433.13; H01Q 1/24
See application file for complete search history.

(56) References Cited

U.S. PATENT DOCUMENTS

| 6,285,327 | B1 | 9/2001 | See |
| 6,380,895 | B1 | 4/2002 | Moren et al. |
| 6,861,989 | B1 * | 3/2005 | Morningstar et al. ........ 343/702 |
| 6,975,273 | B1 * | 12/2005 | Choi .......................... 343/702 |
| 2001/0004269 | A1 | 6/2001 | Shibata et al. |
| 2001/0051510 | A1 | 12/2001 | Nakamura |

FOREIGN PATENT DOCUMENTS

| EP | 1 093 675 | 4/2001 |
| EP | 1 170 929 | 1/2002 |
| EP | 1 266 425 | 12/2003 |
| JP | 6-311216 | 11/1994 |
| JP | 11-30226 | 2/1999 |
| JP | 2000-138522 | 5/2000 |

(Continued)

*Primary Examiner*—Hoanganh Le
(74) *Attorney, Agent, or Firm*—Pearne & Gordon LLP

(57) ABSTRACT

It is an object of the present invention to provide a communication terminal that can suppress the deterioration of a gain of an antenna either in an opening state or in a closing state. The communication terminal includes a hinge part for connecting a first casing member (101*a*) to a second casing member (101*b*) so as to freely open and close, a second antenna (103*b*) provided near the hinge part in the second casing member (101*b*) and a flexible base for connecting together first and second printed circuit boards (116*a*) and (116*b*) respectively provided in the first and second casing members (101*a*) and (101*b*). The hinge part includes a first rotating shaft serving as an axis when the two casing members (101*a*) and (101*b*) rotate in opposed directions and a second rotating shaft serving as an axis upon rotating in a direction perpendicular to the rotating direction by the first rotating shaft. The flexible base is disposed in one end side of the first rotating shaft and a feeding part (103*h*) of the second antenna (103*b*) is disposed in the other end side of the first rotating shaft.

9 Claims, 21 Drawing Sheets

FOREIGN PATENT DOCUMENTS

| | | |
|---|---|---|
| JP | 2001-169166 | 6/2001 |
| JP | 2001-326524 | 11/2001 |
| JP | 2002-27066 | 1/2002 |
| JP | 2002-33804 | 1/2002 |
| JP | 2002-504768 | 2/2002 |
| JP | 2003-527015 | 9/2003 |
| WO | 99/03168 | 1/1999 |
| WO | 01/69716 | 9/2001 |

* cited by examiner

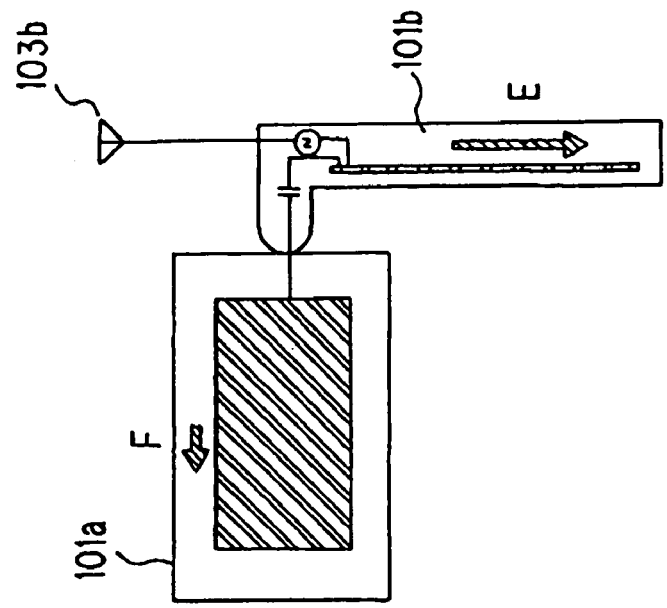
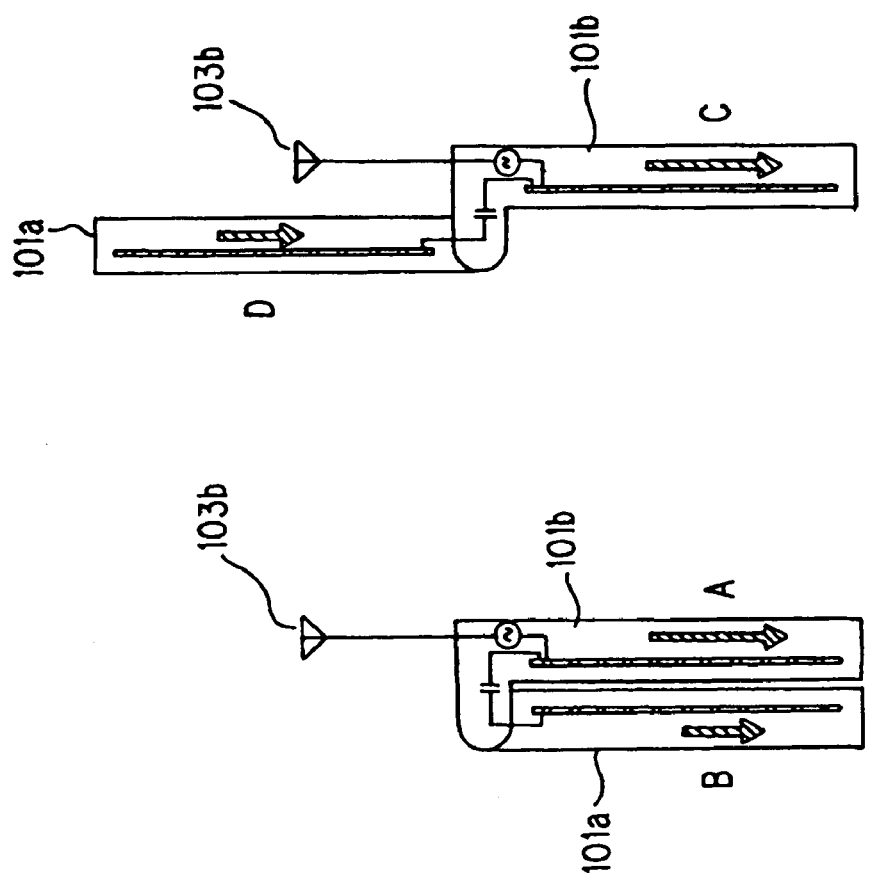
FIG. 16 (a)
FIG. 16 (b)
FIG. 16 (c)

x-y PLANE
(WHEN CASINGS ARE OPENED)

x-y PLANE
(WHEN CASINGS ARE CLOSED)

COMMUNICATION TERMINAL

TECHNICAL FIELD

The present invention relates to a communication terminal having a freely opening and closing casing and more particularly to a casing structure of a communication terminal having an antenna for transmitting and receiving a radio signal.

BACKGROUND ART

As a first example of a usual freely opening and closing type communication terminal, a communication terminal is disclosed in Patent Document 1. Here, the communication terminal is described by using the drawings. FIG. 20 is a view showing the structure of the usual communication terminal and a principle of an operation of an antenna provided therein. FIG. 20(a) shows a state that a casing is closed and FIG. 20(b) shows a state that the casing is opened. In FIGS. 20(a) and 20(b), the communication terminal includes a first casing 202 connected to an antenna 201 capable of being pulled out and a second casing 203 located in the side surface of the antenna 201 upon using and made of metal or a material including metal. The first casing 202 is connected to the second casing 203. In this communication terminal, high frequency electric current supplied to the first casing 202 having the antenna 201 is also supplied to the casing 203. The directions of the electric current at this time are shown by arrow marks G, H, I and J.

As a second example of a usual freely opening and closing type communication terminal, Patent Document 2 discloses a communication terminal in which a first casing having an antenna provided in one end side is connected to a second casing through a hinge part at the other end side so as to freely open and close and a spirally wound flexible base is disposed in the hinge part. FIG. 21 is a view showing the change of the flexible base in accordance with opening and closing operations when the flexible base is spirally wound and provided in the usual communication terminal. FIG. 21(a) shows a state that the casings are opened and FIG. 21(b) shows a state that the casings are closed. In the flexible base 204 shown in FIG. 21(a), a full line shows a state when the casings are opened. A two-dot chain line shows a case when the casings are closed not to change an angle of torsion.

(Patent Document 1)

JP-A-2002-33804

(Patent Document 2)

JP-A-6-311216

However, in the usual communication terminal of the first example, since the first and second casings 202 and 203 are connected together, when the casings are closed, the electric current supplied to each of the casings 202 and 203 has the same phase (the arrow marks G and H have the same directions). That is, the electric current flows from an end side in which the antenna 201 is provided to an opposite end side. When the two casings 202 and 203 are opened, casing current (an arrow mark I) supplied to the first casing 202 is not changed from casing current (an arrow mark G) when the casings are closed. However, the direction of casing current (an arrow mark J) supplied to the second casing 203 is different from the direction of the casing current (an arrow mark I) supplied to the first casing 202 (opposite phase). Accordingly, when a casing closing state is changed to a casing opening state, radiation efficiency may be probably undesirably deteriorated.

Further, in the usual communication terminal of the second example, the antenna protrudes from the casing. In the protruding antenna as described above, when a user takes out the communication terminal accommodated in a pocket, the antenna is inconveniently hooked on the edge part of the pocket. Accordingly, in recent years, even an opening and closing type or collapsible communication terminal having a hinge part has been desired to incorporate an antenna therein.

Further, as shown in FIG. 21, the spirally wound flexible base 204 has a structure in which a bending stress and a torsion stress are generated in accordance with the opening and closing operations of the casings. Thus, a conductor part (a circuit pattern) of the flexible base 204 may be possibly cut. That is, in order to prevent an angle of torsion P of the flexible base wound clockwise from a lower side to an upper side from changing, when the flexible base 204 is wound as shown by the two-dot chain line in FIG. 21(a), the generation of the torsion stress can be avoided. However, in both the ends of the flexible base 204, positions (both side directions of right and left) where the flexible base is fixed to the two casings do not change even when the casings are opened or closed. Accordingly, a state that the casings are opened is changed to a state that the casings are closed as shown by a full line in FIG. 21(b), the angle of torsion is changed to about P/2. Therefore, both the bending stress and the torsion stress are exerted on the flexible base 204 in accordance with the opening and closing operations of the casings.

Ordinarily, the flexible base has an adequately strong structure relative to the bending stress, because the flexible base has flexibility. However, when various compound stresses act on the flexible base, a disconnection or a break is caused. Accordingly, in the usual communication terminal, when the opening and closing operations of the casings are repeated, the disconnection or the break of the flexible base may be possibly caused. Thus, there is room for improvement in this respect.

The present invention is proposed by considering the above-described problems and it is an object of the present invention to provide a communication terminal that can suppress the deterioration of a gain of an antenna either in an opening state or in a closing state.

DISCLOSURE OF THE INVENTION

A communication terminal according to the present invention includes a hinge part for connecting two casing members so as to freely open and close, an antenna provided near the hinge part in one casing member of the two casing members and a flexible conductor for connecting together conductive portions respectively provided in the two casing members. The hinge part includes a first rotating member serving as an axis when the two casing members rotate in opposed directions and a second rotating member serving as an axis when one casing member of the two casing members under a non-opposed state is rotated relative to the other casing member in a direction perpendicular to the rotating direction when the first rotating member serves as the axis. The flexible conductor is disposed in one end side of the first rotating member and a feeding part of the antenna is disposed in the other end side of the first rotating member.

According to this structure, in the opening and closing type communication terminal having a flexible base provided in the hinge part, even when the flexible conductor is disposed near the antenna, the flexible base is separated from the feeding part of the antenna. Thus, the influence of the flexible conductor to an antenna performance can be eliminated and the deterioration of the gain of the antenna can be suppressed even under any of opening and closing states.

Further, according to the present invention, in the communication terminal, at least one casing member of the two casing members is insulated from the hinge part.

According to this structure, when the two casing members are opened, the high frequency electric current of an opposite phase supplied from the one casing member to the other casing member can be eliminated. Further, when the two casings are closed, the high frequency electric current supplied to the other casing member is allowed to have the same phase as that of the high frequency electric current supplied to the one casing member.

Further, according to the present invention, in the communication terminal, the flexible conductor disposed in the one end side of the first rotating member has a winding part formed.

According to this structure, the break and disconnection of the flexible base due to the opening and closing operations of the casing members can be avoided. Accordingly, the life of the flexible base can be lengthened. Further, the curvature of the winding part is changed in accordance with the opening and closing operations of the two casing members so that the flexible conductor comes near to the antenna. Even at this time, since the flexible conductor is disposed in a part opposite to the feeding part of the antenna to which the high frequency electric current is concentrated, the deterioration of characteristics of a voltage-standing-wave ratio (VSWR) as one of various characteristics of the antenna can be avoided and a stable antenna gain can be obtained.

Further, according to the present invention, in the communication terminal, a cable is provided for connecting together the conductive portions in the two casing members and the cable is inserted into the winding part.

According to this structure, when the conductive portions in the two casing members are connected together by the cable, the length of the cable can be made the shortest.

Further, according to the present invention, in the communication terminal, the antenna is extended from the one end side to the other end side of the first rotating member.

According to this structure, even when the antenna does not protrudes from the casing member, the deterioration of an antenna performance can be avoided and adequate radiation characteristics can be obtained.

Further, according to the present invention, in the communication terminal, the antenna has a first element part having a first electric length and a second element part having a second electric length. The one end sides of the first element part and the second element part are connected together by a reactance part having a reactance component. The other end side of one element part of the two element parts serves as a feeding part.

According to this structure, one antenna has a plurality of resonance points (resonance frequency) and the change of an antenna gain in a low frequency band can be prevented in any of opening and closing states.

Further, according to the present invention, in the communication terminal, the electric length of the first element part is set to ¼ times as long as the wavelength .1 of a first frequency and the electric length of the second element part is formed in such a way that the sum of the electric length of the second element part and the electric length of the first element part is set to ¼ or ⅜ times as long as the wavelength .2 of a second frequency.

According to this structure, good antenna characteristics can be obtained in the two frequencies having the first frequency and the second frequency.

According to the present invention, in the communication terminal, a receiving part and a transmitting part are provided in exposed surface sides of the two casing members which are exposed when a state that the two casing members are closed is changed to a state that the two casing members are opened. The antenna is disposed near the hinge part in a back surface side opposite to the exposed surfaces.

According to this structure, when a user holds the communication terminal by hand, the antenna can be hardly covered with the hand and the antenna can be separated from the head part of the human body. Thus, a quantity of electromagnetic wave absorbed by the human body can be reduced.

BRIEF DESCRIPTION OF THE DRAWINGS

FIG. 16 is an explanatory view showing a principle of the operation of the second antenna used in the communication terminal according to the embodiment, FIG. 16(a) showing a closing state of casings, FIG. 16(b) showing the first state and FIG. 16(c) showing the third opening state, respectively;

FIG. 21(a) shows an opening state of the casing members and FIG. 21(b) shows a closing state of the casing members, respectively.

Figure 1:
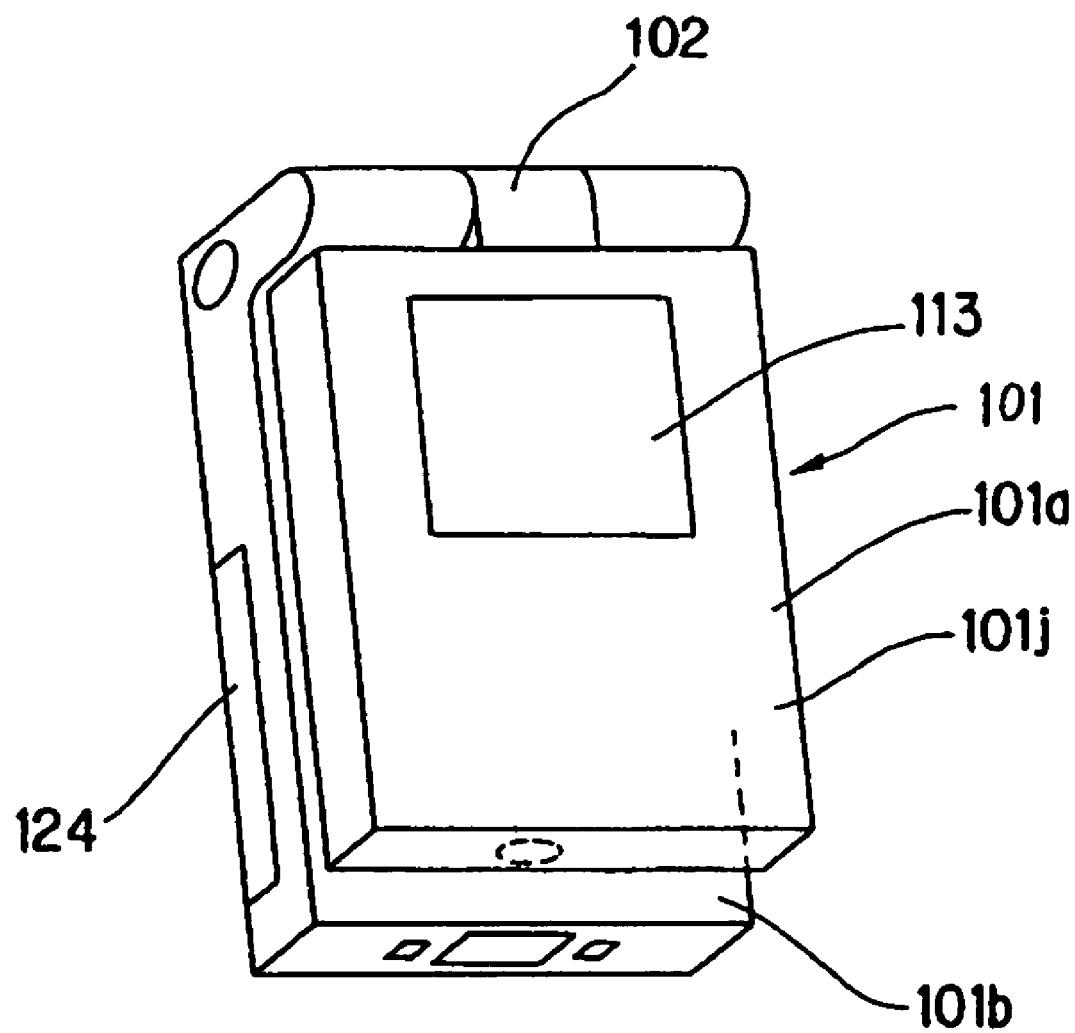
FIG. 1 is a perspective view showing the closing state of an opening and closing type or collapsible communication terminal according to one embodiment of the present invention.

In the drawings, reference numeral 101 designates a casing. 101a designates a first casing member. 101b designates a second casing member. 101c and 101d designate hinge attaching parts. 101e designates a D shaped hole. 101f designates a bearing part. 101g designates a main surface of a second casing member. 101h designates a right side surface of the second casing member. 101i designates a main surface of the first casing member. 101j designates a back surface of the first casing member. 101k designates an inner surface of the second casing member. 102 designates a hinge part. 103 designates an antenna. 103a designates a first antenna. 103b designates a second antenna. 103c designates a first element part. 103d designates a second element part. 103e designates a reactance part. 103f designates a recessed part. 103g designates a protruding part. 103h designates a feeding part. 104 designates a vibrator part. 105 designates an operating part. 105a designates first operating part. 105b designates a second operating part. 106 designates a receiver. 107 designates a speaker. 108 designates a microphone. 109 designates a camera part. 109a designates a first camera part. 109b designates second camera part. 110 designates a first Hall element. 111 designates a second Hall element. 112 designates a first display part. 113 designates a second display part. 114 designates a first permanent magnet. 115 designates second permanent magnet. 116 designates a printed circuit board. 116a designates a first printed circuit board. 116b designates a second printed circuit board. 116c designates a probe type pin connector. 117 designates a transmitting and receiving part. 118 designates data processing part. 119 designates an audio processing part. 120 designates an image processing part. 121 designates an information recording part. 122 designates a control part. 123a designates a protrusion. 123b designates a clearance. 124 designates a battery. 125 designates a first rotating shaft. 125a designates a cut-out part. 125b designates a support part. 125c designates a partition part. 125d designates a slit. 125e designates a tapped hole. 126 designates a second rotating shaft. 127 designates a support plate. 127a designates a recessed part. 127b designates a support hole. 128 designates a guide shaft. 128a designates a large diameter part. 128b designates a small diameter part. 128c designates a parallel groove. 128d designates a D-cut part. 129 designates a first coil spring. 130 designates a first click protruding plate. 130a designates a protruding part. 131 designates a first click recessed plate. 131a designates a recessed part. 132 designates a cam. 133 designates a second click protruding plate. 133a designates a protruding part. 134 designates a second coil spring. 135 designates a bracket. 135a designates a hole. 136 designates an E ring. 137 designates a first rotating shaft bearing. 137a designates a groove. 138 designates a hinge unit. 139 designates a flexible base. 139a designates a corner part. 139b designates a first winding part. 139c designates a second winding part. 140 designates a cable. 141 designates a front cover. 141a designates an engaging claw. 141b designates a screw insert hole. 142 designates a rear cover. 142a designates an engaging claw. 142b designates a screw insert hole. 143a and 143b designates fastening screws.

BEST MODE FOR CARRYING OUT THE INVENTION

Now, embodiments of an opening and closing type or collapsible communication terminal according to the present invention will be described below by referring to the drawings. In the embodiments, the communication terminal will be described as an opening and closing type or collapsible portable telephone terminal that meets a W-CDMA (Wide band Code Division Multiple Access) system and a GSM (Global System for Mobile Communication) system. However, the communication terminal is not limited to the portable telephone terminal and may be applied to any other communication terminals that are opening and closing types.

Figure 2:
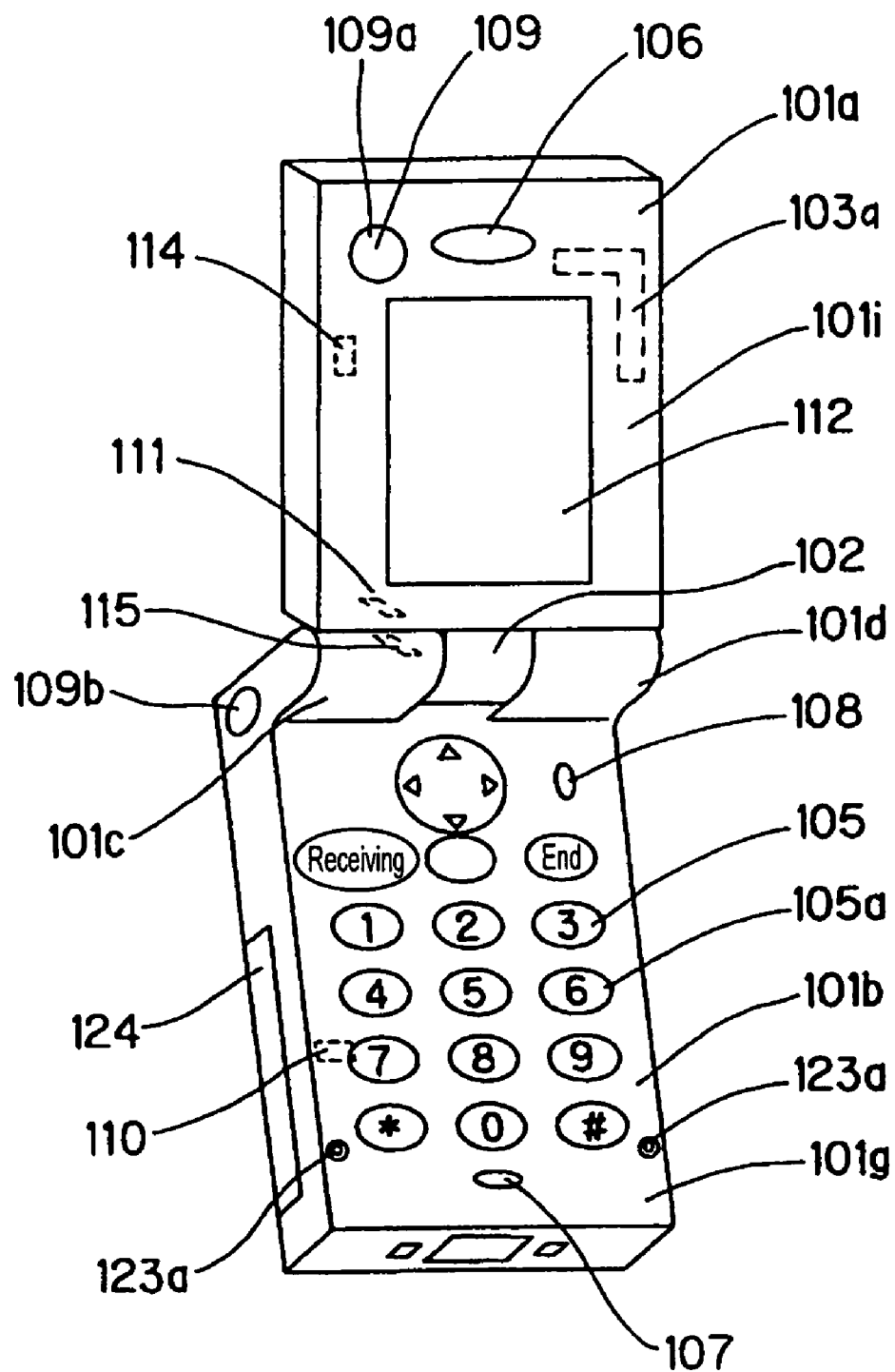
FIG. 2 is a perspective view showing a first opening state of the opening and closing type communication terminal according to one embodiment of the present invention.
Figure 3:
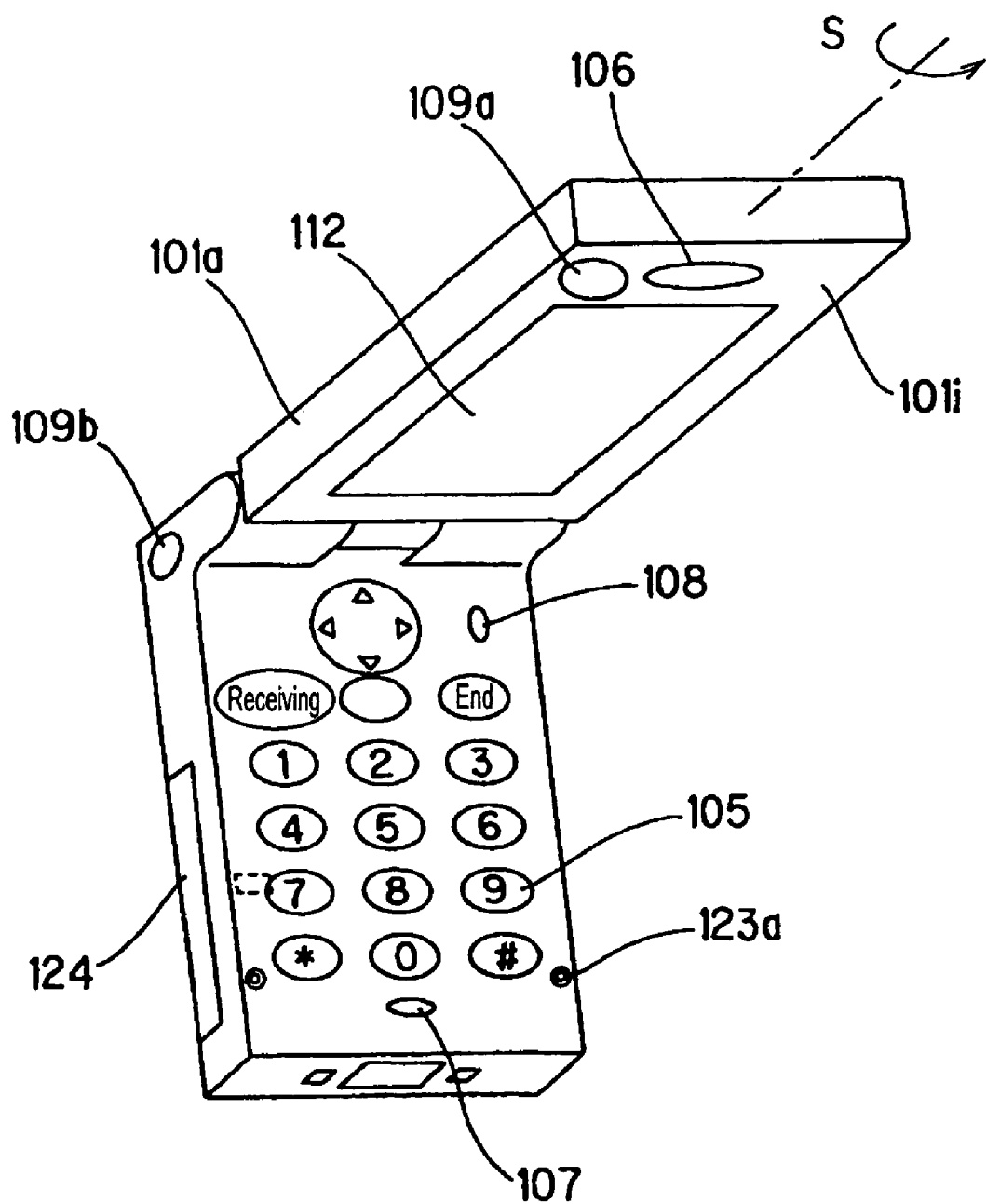
FIG. 3 is a perspective view showing a second opening state of the opening and closing type communication terminal according to one embodiment of the present invention.
Figure 4:
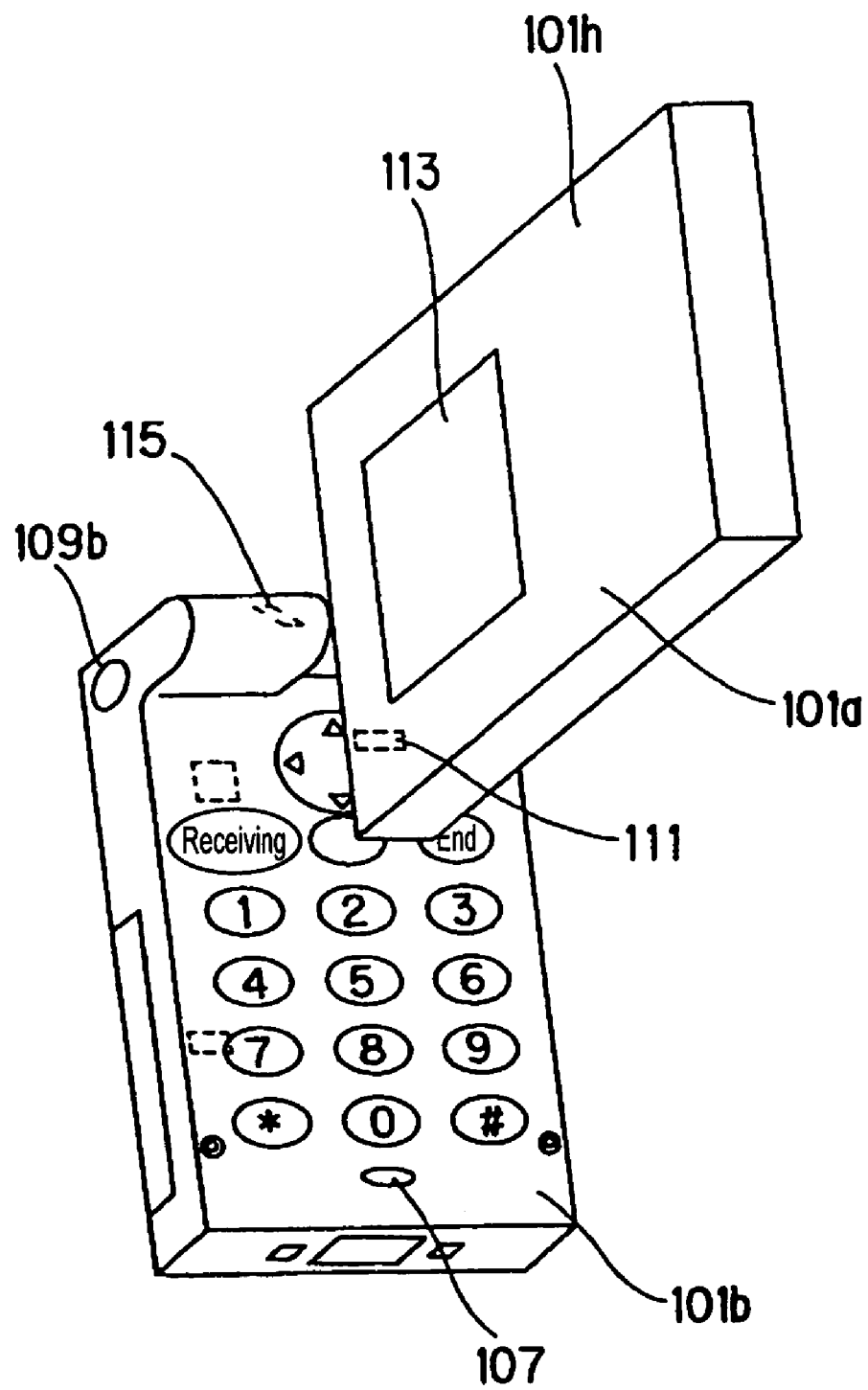
FIG. 4 is a perspective view showing a third opening state of the opening and closing type communication terminal according to one embodiment of the present invention.
Figure 5:
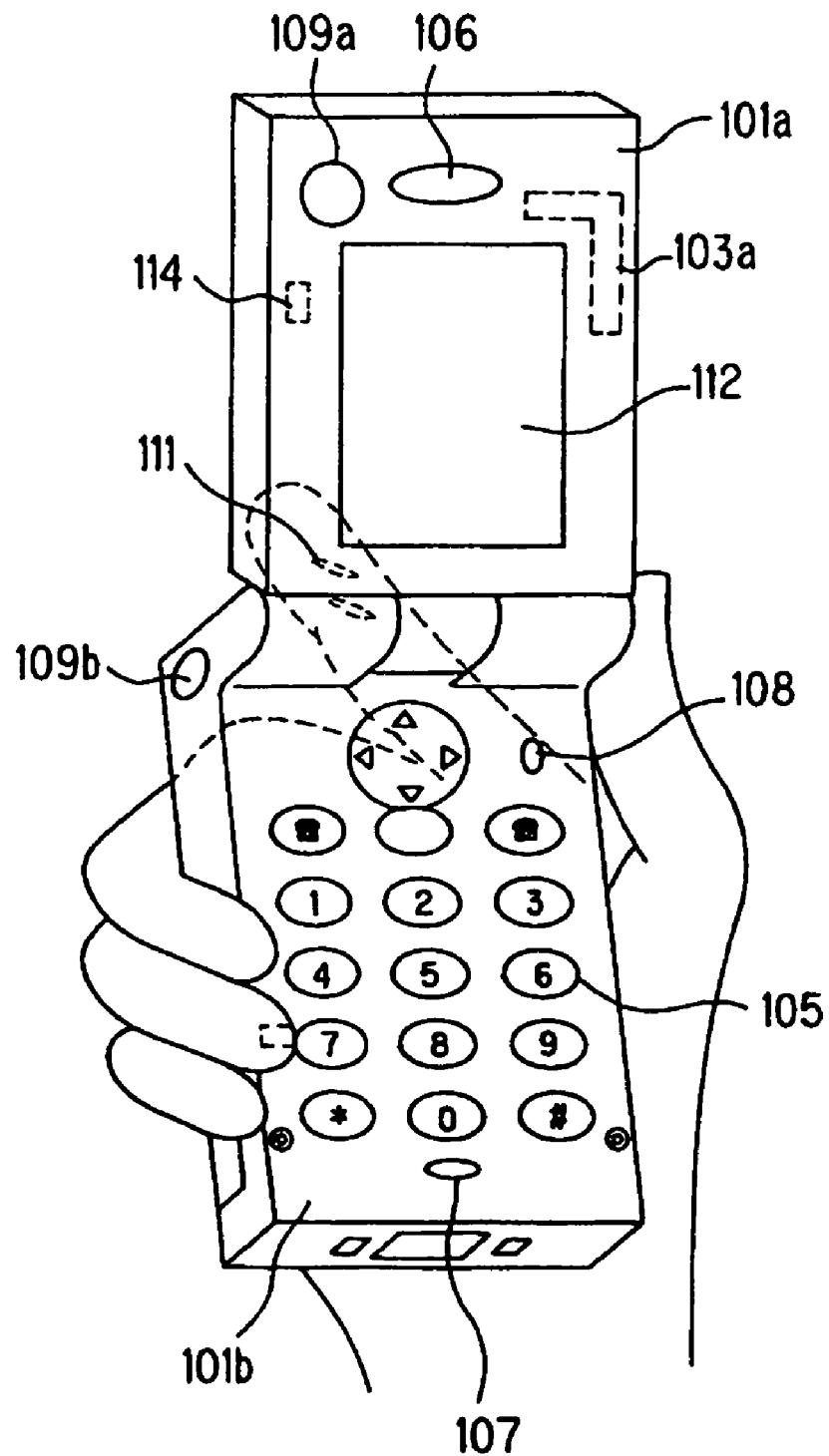
FIG. 5 is a view of an external appearance showing a state that the communication terminal located in the first opening state is held by hand.
Figure 6:
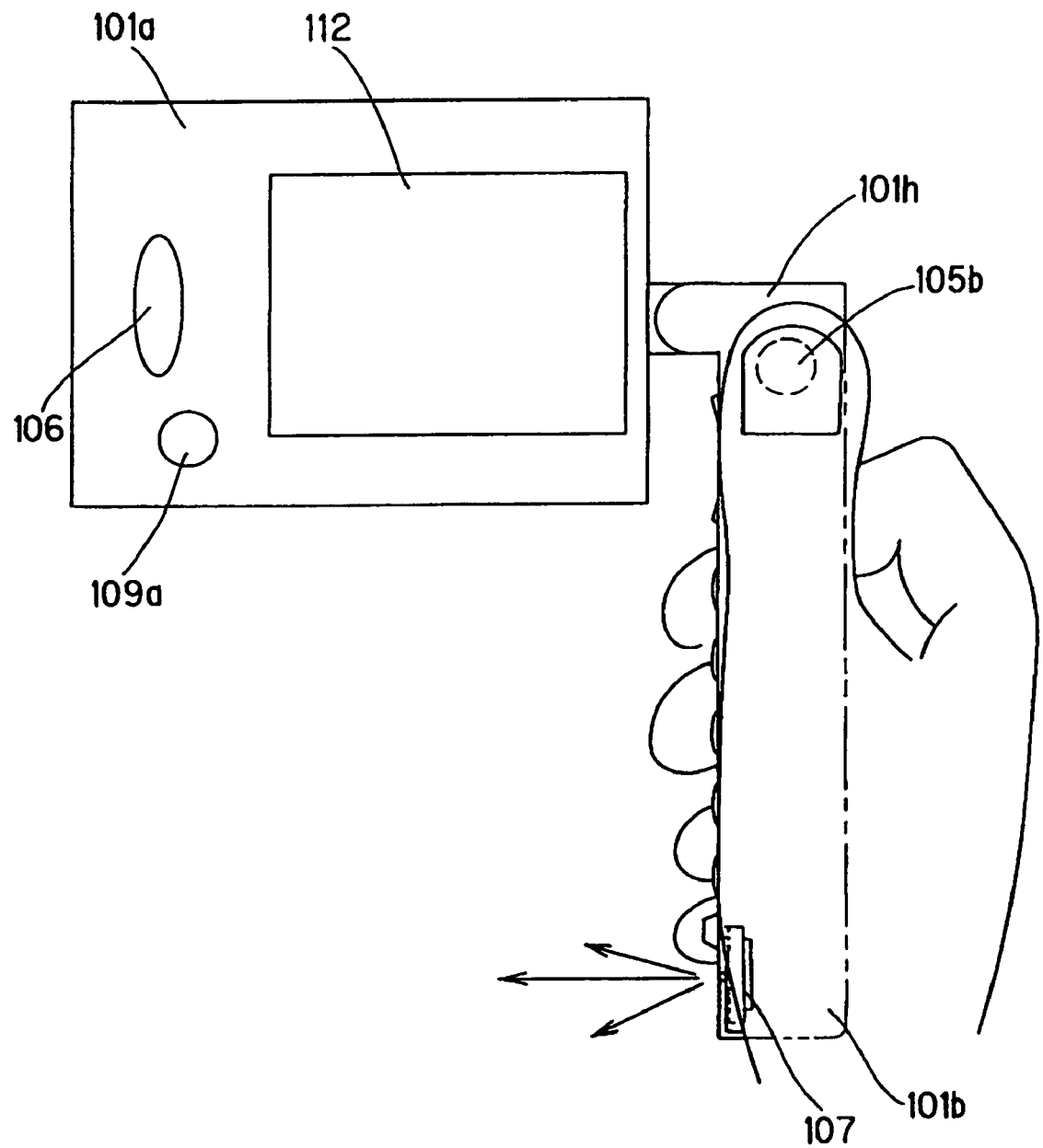
FIG. 6 is a view of an external appearance showing a state that the communication terminal located in the third opening state is held by hand.
Figure 7:
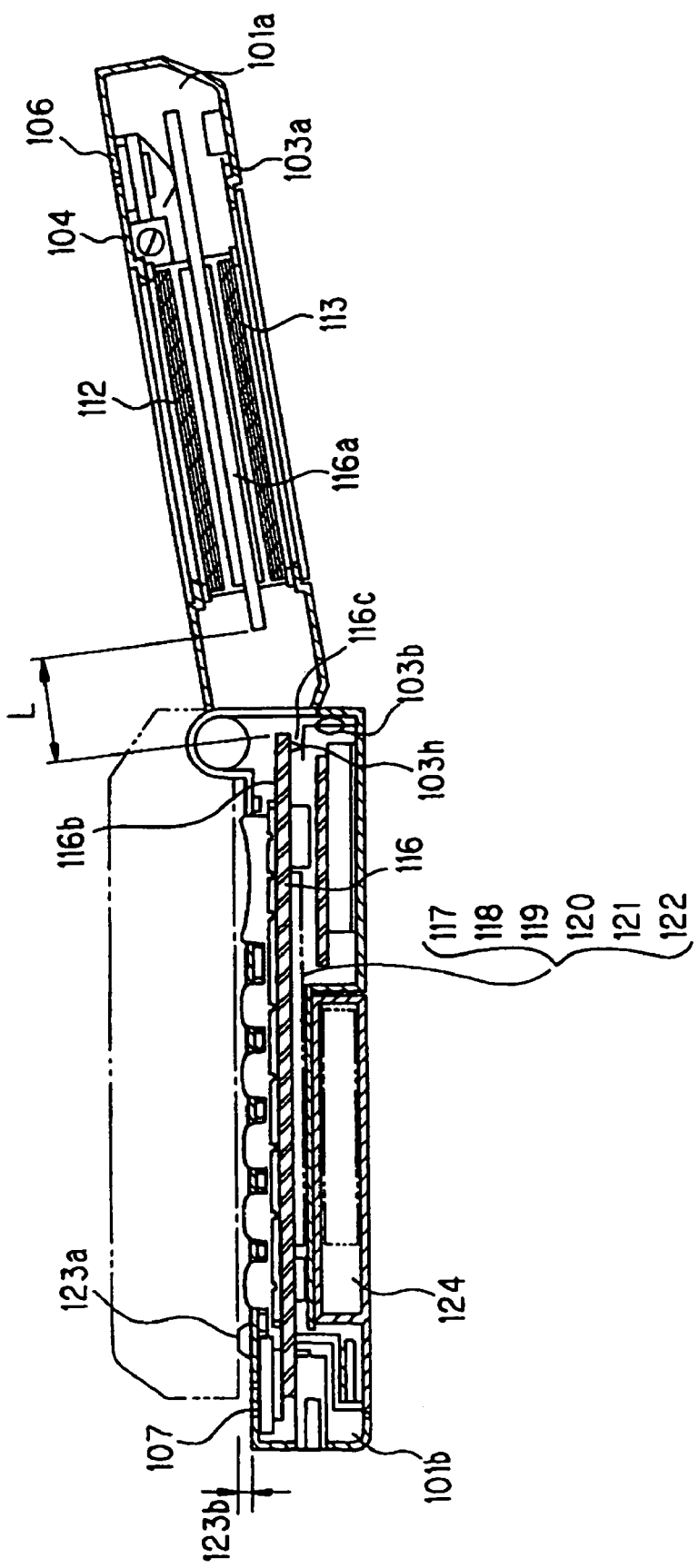
FIG. 7 is a sectional view of the opening and closing type communication terminal according to one embodiment of the present invention.
Figure 8:
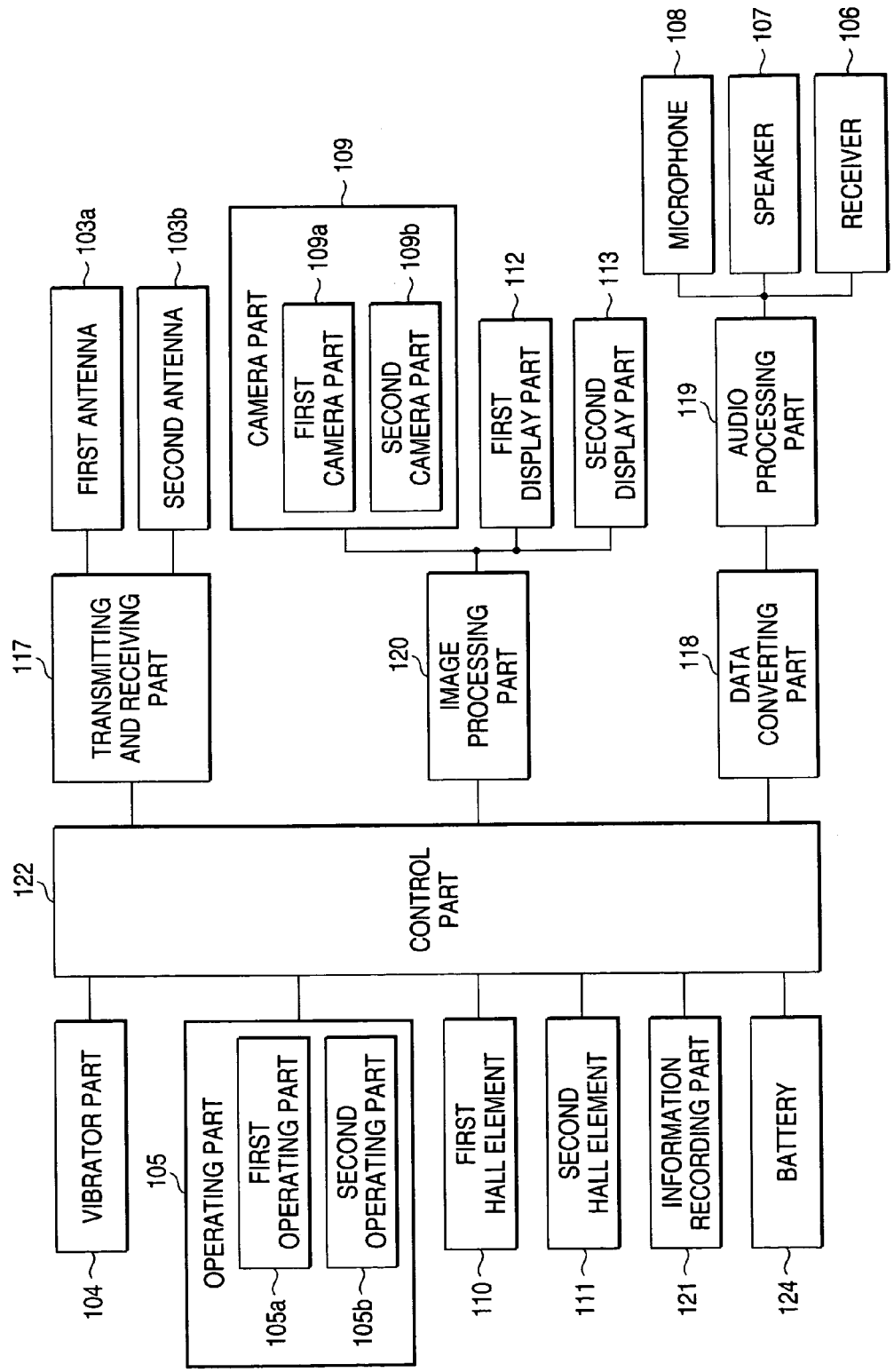
FIG. 8 is a block diagram showing an electric structure of the communication terminal according to one embodiment of the present invention.

FIG. 1 is a perspective view showing the closing state of an opening and closing type or collapsible communication terminal according to one embodiment of the present invention. FIG. 2 is a perspective view showing a first opening state of the opening and closing type communication terminal according to one embodiment of the present invention. FIG. 3 is a perspective view showing a second opening state of the opening and closing type communication terminal according to one embodiment of the present invention. FIG. 4 is a perspective view showing a third opening state of the opening and closing type communication terminal according to one embodiment of the present invention. FIG. 5 is a view of an external appearance showing a state that the communication terminal located in the first opening state is held by hand. FIG. 6 is a view of an external appearance showing a state that the communication terminal located in the third opening state is held by hand. FIG. 7 is a sectional view of the opening and closing type communication terminal according to one embodiment of the present invention. FIG. 8 is a block diagram showing an electric structure of the communication terminal according to one embodiment of the present invention.

As shown in FIGS. 1 to 8, the opening and closing type communication terminal of this embodiment includes a casing 101, a hinge part 102, an antenna 103, a vibrator part 104, an operating part 105, a receiving part (receiver) 106, a speaker 107, a transmitting part (microphone) 108, a camera part 109, a first Hall element 110, a second Hall element 111, a first display part 112, a second display part 113, a first permanent magnet 114, a second permanent magnet 115 and a printed circuit board 116. The printed circuit board 116 includes a transmitting and receiving part 117, a data converting part 118, an audio processing part 119, an image processing part 120, an information recording part 121 and a control part 122 which are shown in FIG. 8.

Now, each of component elements provided in the communication terminal of this embodiment will be described below.

Figure 9:
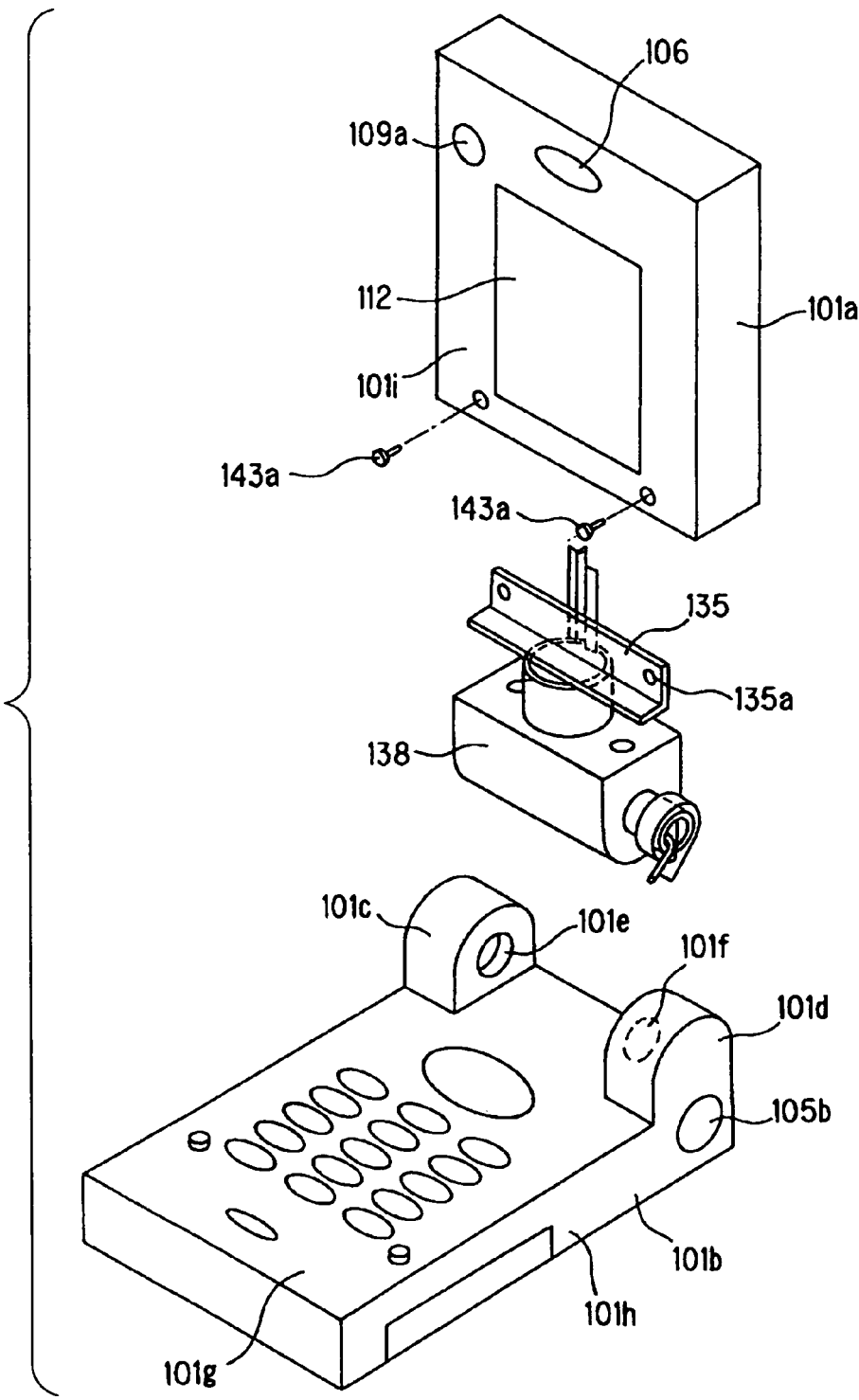
FIG. 9 is an exploded perspective view of a casing of the opening and closing type communication terminal according to the embodiment.

Firstly, a casing 101 will be described. The casing 101 includes a first casing member 101a and a second casing member 101b. FIG. 9 is an exploded perspective view of the casing 101 provided in the communication terminal in this embodiment. As shown in FIG. 9, in the second casing member 101b, hinge attaching parts 101c and 101d for holding a hinge part 102 are formed. In the hinge attaching part 101c, a D shaped hole 101e for holding the hinge part 102 is formed. In the hinge attaching part 101d, a bearing part 101f for supporting the hinge part 102 is formed.

Accordingly, in the casing 101, the first casing member 101a and the second casing member 101b can be opened and closed with respect to the hinge part 102 as an axis. In the following description, a state that the first casing member 101a is closed relative to the second casing member 101b is referred to as a "closing state". A state that the first casing member 101a is opened relative to the second casing member 101b is referred to as an "opening state". Ordinarily, when the communication terminal is carried, the communication terminal is used under the closing state. When the communication terminal is used, it is used under the opening state. As shown in FIG. 2, a state that an angle of the first casing member 101a and the second casing member 101b is substantially 180 degrees is referred to as a "first opening state". As shown in FIG. 3, a state that the first casing member 101a and the second casing member 101b is substantially 90 degrees is referred to as a "second opening state".

Further, as shown in FIG. 4 or FIG. 6, the first and second casing members 101a and 101b are connected together so as to be rotated in a direction perpendicular relative to opening and closing directions under the second opening state. A structure capable of rotating in the direction perpendicular to the opening closing directions will be described below. A state shown in FIG. 4 obtained by rotating the first casing member 101a in a direction shown by an arrow mark S from the second opening state shown in FIG. 3, that is, rotating the first casing member by 90 degrees to the direction perpendicular relative to the opening and closing directions is referred to a "third opening state". The first casing member can be rotated up to 150 degrees in the direction S. Under the third opening state, the first display part 112 is directed to have a large width, so that the first display part is preferably suitable for displaying an image of a VGA size. Accordingly, the display part 112 can display an image larger than that of a case when the display part having the same size is directed to have a large length.

Further, in this embodiment, a protrusion 123a is formed on the surface of the second casing member 101b that abuts on the first casing member 101 under a closing state. Accordingly, under the closing state, a clearance 123b is formed due to the protrusion 123a between the first casing member 101a and the second casing member 101b.

Now, other component elements will be described below. The antenna 103 includes a first antenna 103a and a second antenna 103b. The first antenna 103a incorporated in the first casing member 101a is an antenna for carrying out transmitting and receiving operations of the W-CDMA system only during the opening state. Under the closing state, the transmitting and receiving operations using the first antenna 103a are stopped. The second antenna 103b firstly performs the transmitting and receiving operations of the W-CDMA system during the closing state, and secondly performs the transmitting and receiving operations in a band of the GSM system in any of the opening state and the closing state. That is, the second antenna has resonance points in a 900 MHz band, a 1.8 GHz band and a 1.9 GHz band as the bands of the GSM system and a 2 GHz band as the band of the W-CDMA system. The second antenna is a multi-frequency antenna capable of transmitting and receiving data in the four bands.

As shown in FIG. 8, the transmitting and receiving part 117 is connected to the first and second antennas 103a and 103b to process data received by the first and second antennas 103a and 103b and transmit the data to the data converting part 118. The data converting part 118 converts the received data to audio data and transmits the audio data to the audio processing part 119. The audio processing part 119 decodes the audio data to generate an audio signal, and then, transmits the audio signal to the receiver 106 or the speaker 107. In the receiver 106 or the speaker 107, a voice corresponding to the audio signal transmitted from the audio processing part 119 is outputted.

Further, the audio processing part 119 encodes a voice received by the microphone 108 to generate audio data, and then, transmits the audio data to the data converting part 118. The data converting part 118 converts the transmitted audio data to communication data, and then, transmits the communication data to the transmitting and receiving part 117. The transmitting and receiving part 117 processes the received communication data and transmits the radio wave of a radio signal from the antenna 103.

As shown in FIG. 8, the camera part 109 and the first display part 112 and the second display part 113 are connected to the image processing part 120. Further, the receiver 106, the speaker 107 and the microphone 108 are connected to the audio processing part 119. The audio processing part 119 is connected to the data converting part 118. The control part 122 is connected to the vibrator part 104, the operating part 105, the first Hall element 110, the second Hall element 111, the transmitting and receiving part 117, the data converting part 118 and the information recording part 121 to control these component elements. Further, the control part 122 is connected to a battery 124 and electric power is supplied from the battery 124.

The vibrator part 104 is vibrated upon receiving a call to inform a user of the reception of a call by vibration. The operating part 105 includes a first operating part 105a and a second operating part 105b. The first operating part 105a is provided on an opposed side surface 101g (a main surface of the second casing member) of the second casing member 101b opposed to the first casing member 101a under the closing state. The second operating part 105b is provided on a right side surface 101h (a right side surface of the second casing member) of the opposed side surface 101g. The user operates the first operating part 105a to receive or transmit speech, adjust sound volume of an audio outputted from the receiver 106 or the speaker 107 and input characters, symbols and numeric characters. Further, the user can operate the second operating part 105b to operate the camera part 109.

The first and second display parts 112 and 113 may be formed with a liquid crystal display devices to display characters or symbols, numeric characters, images, maps, etc. The first display part 112 is provided on a side surface 101i (a main surface of the first casing member) of the first casing member 101a that is exposed when the casing 101 is opened. When the casing 101 is closed, the first display part 112 is opposed to the first operating part 105a. Further, the second display part 113 is provided on a side surface (a back surface of the first casing member) 101j opposite to the side surface on which the first display part 112 is provided. The receiver 106, the speaker 107 and the microphone 108 are provided in exposed surfaces that are exposed when the casing 101 changes from the closing state to the opening state, that is, on the main surfaces 101i and 101g of the first and second casing members 101a and 101b. Further, the second antenna 103b is provided near the back surface side opposite to the exposed surface.

The camera part 109 includes a first camera part 109a and a second camera part 109b. The first camera part 109a is provided at a position adjacent to the first display part 112 so that the image of an object to be photographed in a front part of the first display part 112 can be picked-up. Further, the second camera part 109b is provided in the hinge attaching part 101c so that the image of an object to be photographed in the front part of the second display part 113 can be picked-up under the third opening state.

An incident light from the object to be photographed that is caught by the first camera part 109a is converted from an optical signal to an electric signal to generate image information. The image information is processed in the image processing part 120 and then displayed on the first display part 112. On the other hand, an incident light from the object to be photographed that is caught by the second camera part 109b is converted from an optical signal to an electric signal to generate image information. The image information is processed in the image processing part 120 and then displayed on the first and second display parts 112 and 113. The image information is recorded in the information recording part 121 after a prescribed operation is carried out. The image information recording part 121 can record telephone number information or sound information, image information (received image information, etc.) except the image information of a picked-up image, and character information of mails that are being prepared or transmitted or received as well as the above-described image information.

The speaker 107 outputs a call receiving sound upon receiving a call to inform a user of receiving a call. Since the speaker 107 is provided in an end side of a position separate from the hinge attaching parts 101c and 101d of the second casing member 101b, when the casing 101 is closed, the speaker outputs sound to the opposed casing member 101a side. The speaker 107 can output the sound of higher sound volume than that of the receiver 106 at the time of hands-free or TV telephone.

The receiver 106 outputs sound when the communication terminal of this embodiment is used as an ordinary portable telephone. The sound outputted from the receiver 106 is outputted to a front part of the first display part 112. The receiver 106 is provided in the end part side of the first casing member 101a facing the speaker 107 when the casing 101 is closed. When the user receives a speech, the user opens the casing 101 in the first opening state. After a prescribed operation, the user allows an ear to come near to the receiver 106 to listen to the sound. Further, the microphone 108 is provided near the hinge attaching part 101d on the main surface 101g of the second casing member 101b.

The first permanent magnet 114 is provided near the first display part 112 of the first casing member 101a. The first Hall element 110 is provided in the second casing member 101b so as to be opposed to the first permanent magnet 114 when the casing 101 is closed. The second permanent magnet 115 is provided in the hinge part 102. The second Hall element 111 is provided in the first casing member 101a so as to be opposed to the second permanent magnet 115 when the casing 101 is closed and under the first opening state.

When the casing 101 is closed, the first permanent magnet 114 comes near to the first Hall element 110. Accordingly, the first Hall element 110 detects the first permanent magnet 114 to supply a detecting signal to the control part 122. Further, when the casing 101 is not closed (the first, second and third opening states), the first permanent magnet 114 is isolated from the first Hall element 110. Accordingly, since the first Hall element 110 cannot detect the first permanent magnet 114, the first Hall element 110 does not generate the detecting signal.

When the casing 101 is closed and under the first opening state and the second opening state, since the second permanent magnet 115 comes near to the second Hall element 111, the second Hall element 111 detects the second permanent magnet 115 to transmit a detecting signal to the control part 122. Further, when the casing 101 is located in the third opening state, the second permanent magnet 115 is isolated from the second Hall element 111 so that the second Hall element 111 cannot detect the second permanent magnet 115. Thus, the second Hall element 111 does not generate a detecting signal. That is, the control part 122 can recognize the opening and closing states and the rotating states of the first casing member 101a and the second casing member 101b depending on whether or not the control part receives the detecting signals from the first and second Hall elements 110 and 111.

The printed circuit board 116 includes a first printed circuit board 116a and a second printed circuit board 116b. The first printed circuit board 116a is accommodated in the first casing member 101a and the second printed circuit board 116b is accommodated in the second casing ember 101b.

Figure 10:
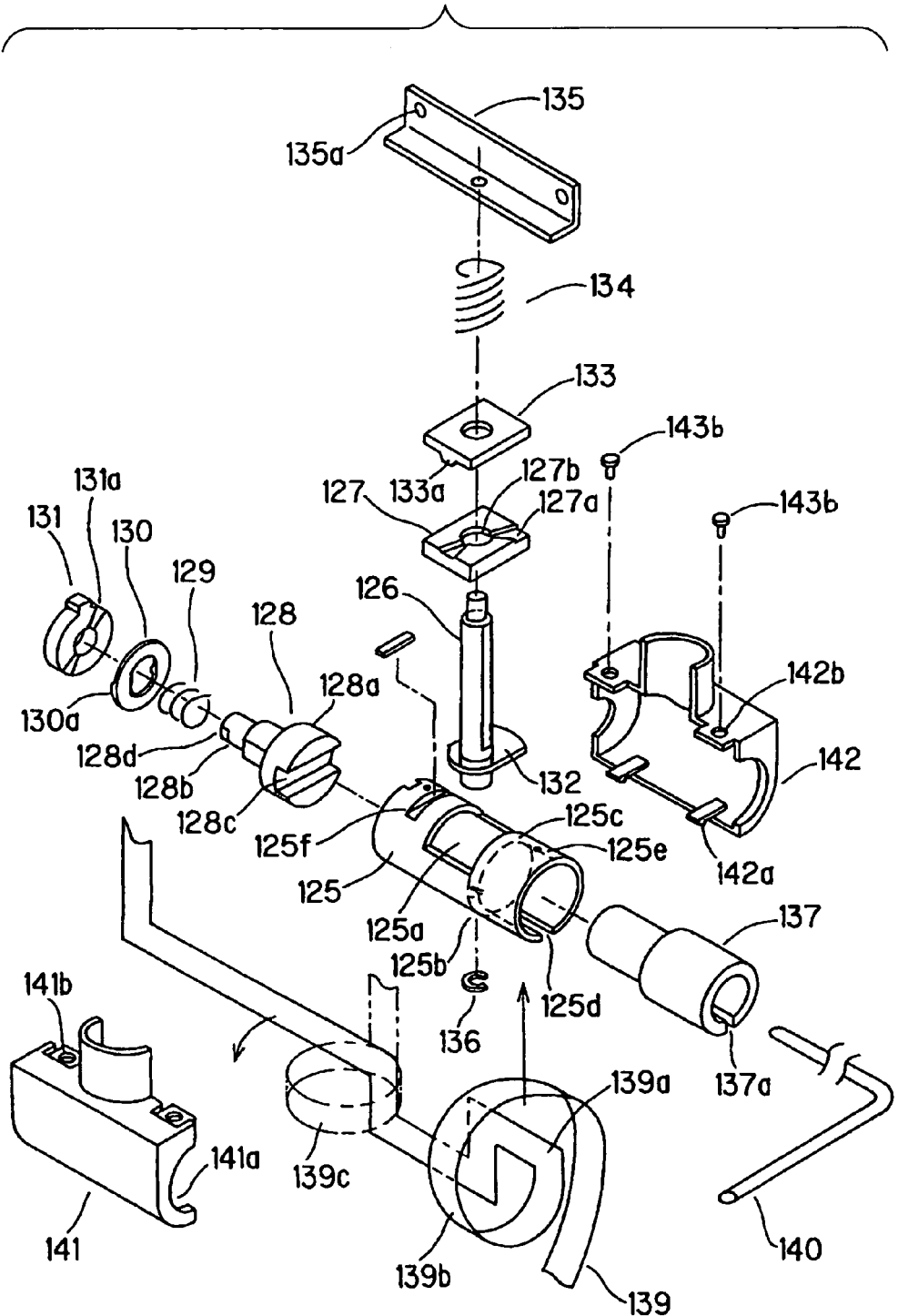
FIG. 10 is an exploded perspective view of a hinge part in the opening and closing type communication terminal according to the embodiment.
Figure 11:
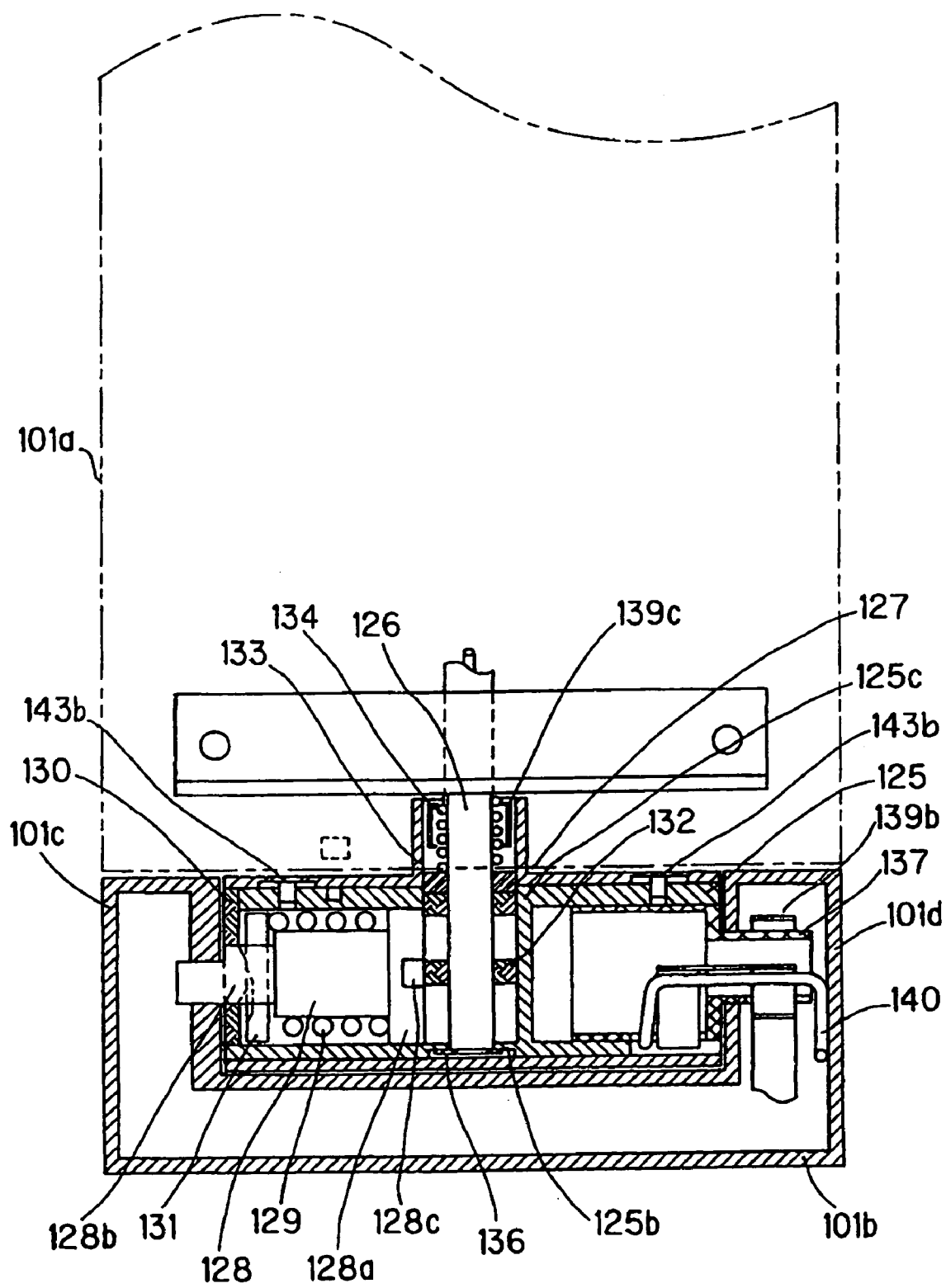
FIG. 11 is a sectional view of the hinge part in the first opening state.
Figure 12:
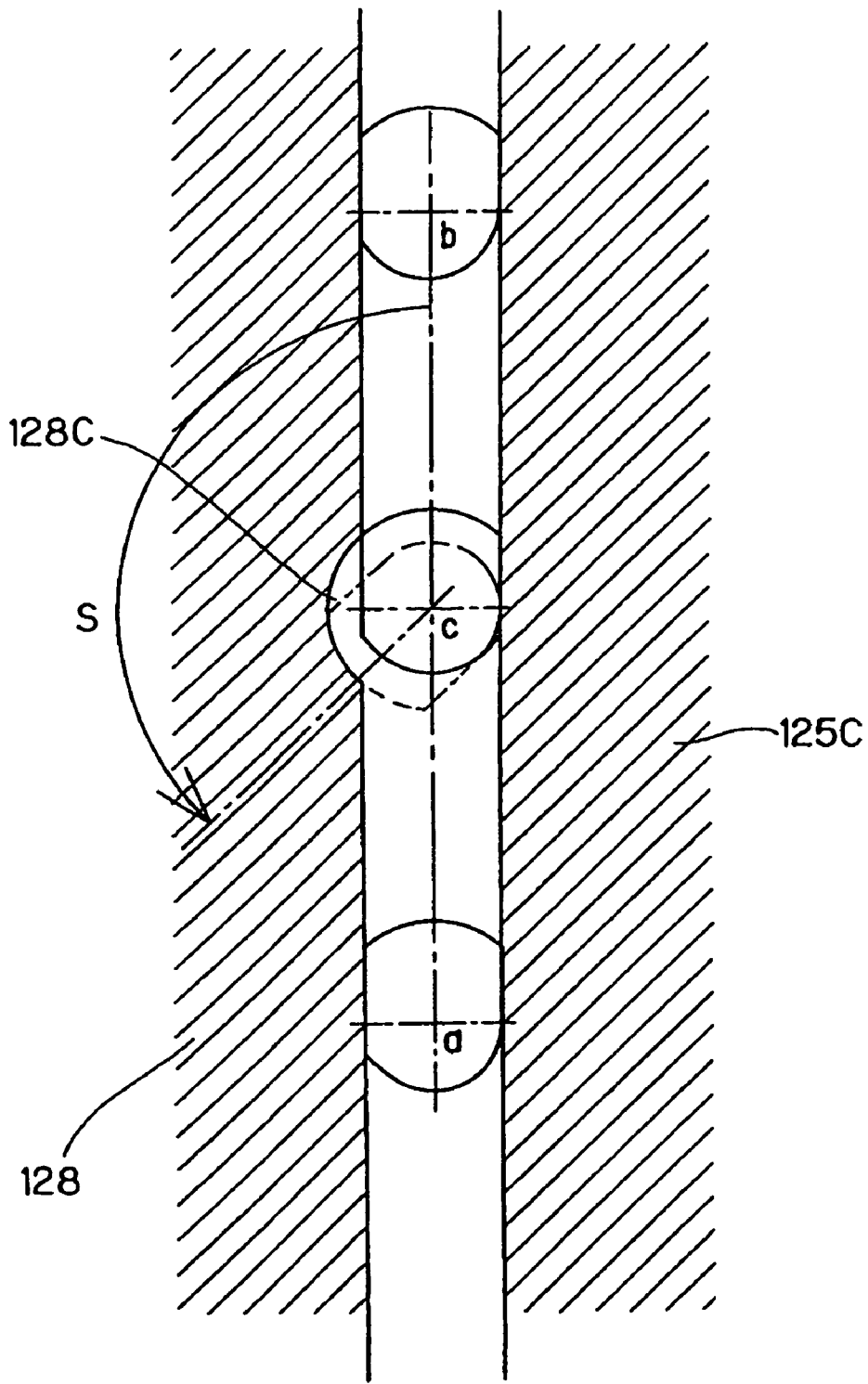
FIG. 12 is an explanatory view (cam diagram) for explaining the operation of a cam attached to the hinge part.

Now, referring to FIGS. 9 to 12, the hinge part 102 is described in detail. FIG. 9 is an exploded perspective view of the casing 101 of the opening and closing type communication terminal according to the embodiment. FIG. 10 is an exploded perspective view of the hinge part shown in FIG. 9. FIG. 11 is a sectional view of the hinge part 102 when the casing 101 is located in the first opening state. FIG. 12 is an explanatory view (a cam diagram) for explaining the operation of a cam attached to the hinge part 102.

As shown in FIGS. 9 to 11, the hinge part 102 provided in the communication terminal of this embodiment includes a hinge unit 138 having a first rotating shaft 125, a second rotating shaft 126, a support plate 127, a guide shaft 128, a first coil spring 129, a first click protruding plate 130, a first click recessed plate 131, a cam 132, a second click protruding plate 133, a second coil spring 134, a bracket 135, an E ring 136 and a first rotating shaft bearing 137, a flexible base 139, a cable 140, a front cover 141, a rear cover 142 and fastening screws 143a and 143b. In the hinge unit 138, only the first rotating shaft bearing 137 is formed with a resin material. Other component parts except the first rotating shaft bearing 137 are made of metallic materials having an electric conductivity. Slide resistance reducing members formed with a polyacetal resin or the like may be suitably provided in slide parts.

The first hollow rotating shaft 125 includes a cut-out part 125*a* at a central part, a support part 125*b* for supporting the second rotating shaft 126, a partition part 125*c*, a slit 125*d*, tapped holes 125*e* and a second permanent magnet holding part 125*f*. In the cut-out part 125*a*, the support plate 127 is disposed. In the support plate 127, a recessed part 127*a* and a support hole 127*b* for supporting the second rotating shaft 126 are formed. In the first rotating shaft 125, the guide shaft 128, the first coil spring 129, the first click protruding plate 130 and the first click recessed plate 131 are attached from the left side in FIG. 10.

The guide shaft 128 has a large diameter part 128*a* and a small diameter part 128*b*. In the large diameter part 128*a*, a parallel groove 128*c* is formed. In the end of the small diameter part 128*b*, a D-cut part 128*d* is formed. The first click protruding plate 130 is provided not to rotate on the guide shaft 128 and is movable only in the thrust direction of the small diameter part 128*b*. The first click recessed plate 131 to which the small diameter part 128*b* is inserted to freely rotate is fixed to the end part side of the first rotating shaft 125.

The first coil spring 129 urges the first click protruding plate 130 to the first click recessed plate 131 side. When the casing 101 is closed and under the first opening state, a protruding part 130*a* of the first click protruding plate 130 is engages with a recessed part 131*a* of the first click recessed plate 131. When the casing 101 is moved from the first opening state to the closing state, the protruding part 130*a* is disengaged from the recessed part 131*a*. On the other hand, when the casing 101 is moved from the closing state to the first operating state, the protruding part 130*a* is engaged with the recessed part 131*a*. That is, when the protruding part 130*a* is engaged with or disengaged from the recessed part 131*a*, the user can obtain a feeling of click. On the second rotating shaft 126, the cam 132, the support plate 127, the second click protruding plate 133, the second coil spring 134 and the bracket 135 are mounted from the upper side of an intermediate part of FIG. 10. The second rotating shaft 126 is supported by the support plate 127 attached to the cut-out part 125*a* of the first rotating shaft 125 and the support part 125*b* of the first rotating shaft 125. In the end of the second rotating shaft 126, the E ring 136 is provided and held by the first rotating shaft 125 so as to freely rotate. The second click protruding plate 133 is provided to move only in the thrust direction of the second rotating shaft 126. The second coil spring 134 urges the second click protruding plate 133 to the support plate 127 side.

A protruding part 133*a* of the second click protruding plate 133 is engaged with the recessed part 127*a* of the support plate 127 until the casing 101 reaches the first opening state via the second opening state from the closing state, or only in the third opening state. When the casing 101 moves from the second opening state to the third opening state, the protruding part 133*a* of the second click protruding plate 133 is disengaged from the recessed part 127*a* of the support plate 127. In the third opening state, the protruding part 133*a* is engaged again with the recessed part 127*a*. That is, the same structure of the protruding part 130*a* of the first click protruding plate 130 and the recessed part 131*a* of the first click recessed plate 131 gives a feeling of click to the user.

In the bracket 135, holes 135*a* that are fastened to the first printed board 116*a* and the first casing member 101*a* together by fastening screws 143*a* are formed. In this embodiment, the bracket 135 is insulated from the first printed circuit board 116*a*. In this structure, the hinge unit 138 is insulated from the printed circuit boards 116*a* and 116*b* of the first and second casing members 101*a* and 101*b* sides. The first casing member 101*a* is insulated from the second casing member 101*b*. On the contrary, when the hinge unit 138 is grounded to the first printed circuit board 116*a* through the bracket 135, a ground pattern may be formed in the first printed circuit board 116*a* that abuts on the bracket 135. Even when the first printed circuit board 116*a* is not provided, the hinge unit 138 is desired to be electrically connected to the first casing member 101*a* side. In this case, for instance, an outer package part of the first casing member 101*a* may be formed with a metallic material having an electric conductivity such as an aluminum alloy or a magnesium alloy by a die-cast method. Then, the hinge unit may be connected to the outer package part.

A space L between the first printed circuit board 116*a* as a conductor part of the first casing member 101*a* side and the second printed circuit board 116*b* as a conductor part of the second casing member 101*b* side is set to about /10 (15 mm), assuming that the wavelength of a 2 GHz band is 150 mm. Thus, the space between the first printed circuit board 116*a* and the second printed circuit board 116*b* has high impedance to achieve a capacity coupling between them. To achieve the capacity coupling of both the printed circuit boards, the above-described space L is more preferably narrower.

The cam 132 is fixed to the second rotating shaft 126 and accommodated in the first rotating shaft 125 so as to be sandwiched in between the partition part 125*c* of the first rotating shaft 125 and the large diameter part 128*a* of the guide shaft 128. The cam 132 intersects the parallel groove 128*c* of the guide shaft 128 when the casing 101 is located in the first opening state from the closing state except the second opening state. The cam 132 is parallel to the parallel groove 128*c* under the second operating state. In the second opening state, the cam 132 rotating together with the rotation of the second rotating shaft 126 can be guided to the parallel groove 128*c*. Thus, the first casing member 101*a* can be rotated in a direction S. Here, the above-described movement is described by using a cam diagram shown in FIG. 12.

In the cam diagram in FIG. 12, an oblique line part in the right side shows the partition part 125*c*. Further, an oblique line part in the left side shows the large diameter part 128*a* of the guide shaft 128. A circular arc part shows the parallel groove 128*c*. Here, the position of the cam 132 when the casing 101 is closed is shown by a position a. The position of the cam 132 when the casing 101 is located in the first opening state is shown by a position b. Further, the position of the cam 132 when the casing 101 is located in the second opening state is shown by a position c.

In the positions a and b, the right and left end faces of the cam 132 are surrounded by the partition part 125*c* and the large diameter part 128*a*, so that the can 132 cannot be rotated. In the position c, since the partition part 125*c* is provided in the right end face side of the cam 132, the cam cannot rotate in an opposite direction to the direction S. The parallel groove 128*c* exists in the left end face side of the cam 132, so that the cam can rotate I the direction S by 150 degrees. Under a state that the cam rotates in the direction S by 150 degrees, a part of the cam 132 is located in the parallel groove 128*c*. Under this state, since the thickness of the cam 132 is surrounded by the parallel groove 128*c*, even when the casing 101 tries to change to the closing state or the first opening state, this operation is suppressed.

Accordingly, when the casing 101 is opened and closed during the closing state to the first opening state, the first casing member 101a cannot be rotated in the direction S or the opposite direction to the direction S under states except the second opening state. Further, in the second opening state, the first casing member cannot be rotated in the direction opposite to the direction S and can be rotated by 150 degrees in the direction S. Further, during the second opening state to the third opening state, the first rotating shaft 125 cannot rotate so that the casing cannot be opened and closed. Thus, the edge parts of the first casing member 101a are prevented from abutting on the main surface 101g of the second casing member 101b to break the second casing member.

In the first rotating shaft 125, the first hollow rotating shaft bearing 137 is mounted from the right side of an intermediate part in FIG. 10. A groove 137a of the first rotating shaft bearing 137 is directed and formed in the same direction as that of the slit 125d.

The flexible base 139 and the cable 140 are attached to the hinge unit 138. The flexible base 139 having a corner part 139a electrically connects the first casing member 101a to the second casing member 101b. One end side of the corner part 139a is wound on the first rotating shaft bearing 137 to form a first winding part 139b. The corner part 139a is inserted into the first rotating shaft bearing 137 from the groove 137a. The other end side of the corner part 139a passes through the slit 125d and escapes from the first rotating shaft 125 and is wound by about a half round on the first rotating shaft 125. Further, the other end of the corner part 139a is wound on the second rotating shaft 126 to form a second winding part 139c and the flexible base is connected to the first casing member 101a.

The cable 140 for electrically connecting the first antenna 103a provided in the first casing member 101a to the transmitting and receiving part 117 provided in the second casing member 101b is inserted into the first rotating shaft bearing 137 from the end part of the first rotating shaft bearing 137. Then, the cable goes out from the slit 125d and is extended to the first casing member side 101a. The cable passes the inner side of the second winding part 139c and is connected to the first antenna 103a.

After the flexible base 139 and the cable 140 are attached to the hinge unit 138, the font cover 141 and the rear cover 142 for the outer package are fixed by fastening screws 143b. In the front cover 141 and the rear cover 142, engaging claws 141a and 142a and screw insert holes 141b and 142b are respectively provided. The screw insert holes 141b and 142b are provided to be directed to the bracket 135 side provided in the second rotating shaft 126. The front cover 141 and the rear cover 142 hold the hinge unit 138 so as to surround the hinge unit to engage the engaging claws 141a and 142a with each other. The fastening screws 143b pass through the screw insert holes 141b and 142b and are screwed to the tapped holes 125e of the first rotating shaft 125. With this structure, the hinge part 102 is completed.

The D-cut part 128d formed in the end of the small diameter part 128b is supported by the D shaped hole 101e provided in the hinge attaching part 101c of the second casing member 101b. Further, the outer periphery of the first rotating shaft bearing 137 is supported by the bearing part 101f of the hinge attaching part 101d of the second casing member 101b and the hinge part 102 is attached to the second casing member 101b. Further, the first casing member 101a is attached to the bracket 135.

Figure 13:
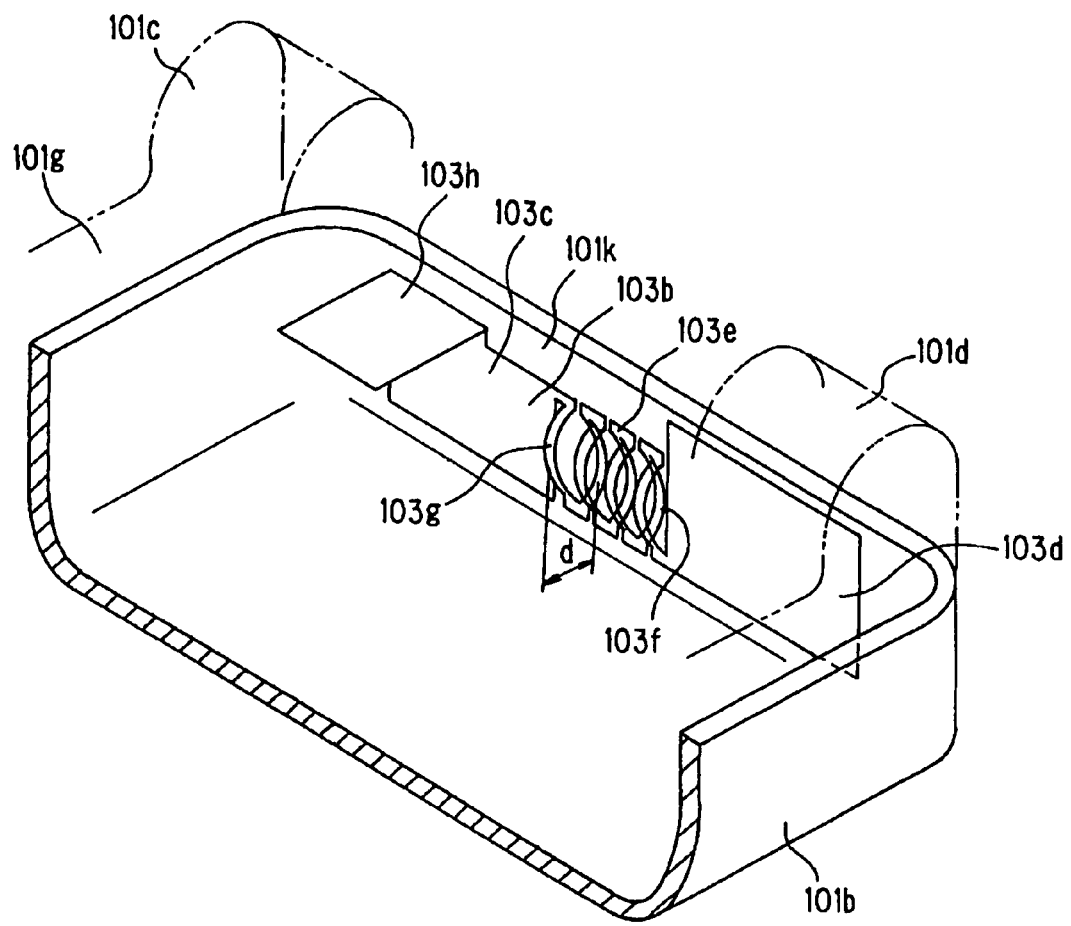
FIG. 13 is a perspective view showing the structure of a second antenna provided in the communication terminal according to the embodiment.

Now, a structure of the second antenna will be described below in detail by referring to the drawings. FIG. 13 is a perspective view showing a structure near the second antenna 103b provided in the communication terminal in this embodiment. In FIG. 13, the second antenna 103b is stuck and fixed to an inner surface 101k adjacent to the main surface 101g of the second casing member 101b and located in side surfaces near the hinge attaching parts 101c and 101d opposed in close to the first casing member 101a when the casing 101 is located in the first opening state. The second antenna 103b includes a first element part 103c, a second element part 103d and a reactance part 103e disposed between the first and second element parts 103c and 103d and formed by a press working.

Figure 14:
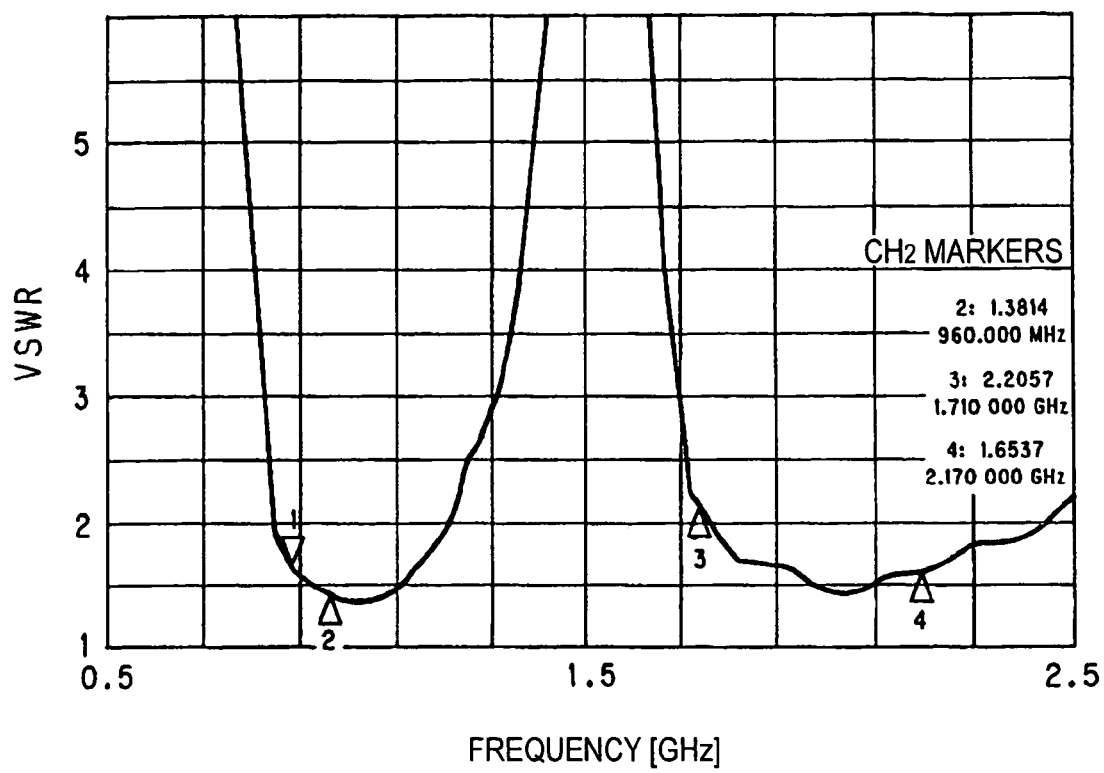
FIG. 14 is a characteristic view showing VSWR characteristics of the second antenna provided in the communication terminal according to the embodiment.

The electric length of the first element part 103c is formed so as to be ¼ times as long as the wavelength .1 of frequency of about 1.9 GHz. Further, the electric length of the second element part 103d is formed so that the sum of the electric length when one end sides of the first and second element parts 103c and 103d are connected together by the reactance part 103e is ¼ times (may be set to ⅜ times) as long as the wavelength .2 of frequency of 900 MHz. The reactance part 103e is formed so that a step of each of recessed parts 103f and protruding parts 103g provided at equal intervals has substantially d. A feeding part 103h provided in the other end side of the first element part 103c is urged to a probe type pin connector 116c mounted on the surface of a left corner part of the second printed circuit board 116b and electrically connected to the second printed circuit board 116b as shown in FIG. 7. The feeding part 103h is disposed at a position separate from the flexible base 139 accommodated in the hinge attaching part 101d. The first and second element parts 103c and 103d are connected together by the reactance part 103e in such a way, so that a multi-frequency antenna having a plurality of resonance points can be realized. FIG. 14 shows VSWR characteristics of the second antenna 103b. This characteristic view shows the actually measured data of VSWR in a frequency range of 0.5 to 2.5 GHz.

In the communication terminal of this embodiment constructed as described above, the user can use the communication terminal by holding the receiver 106 to his or her ear under the first opening state or holding the receiver under a hands-free state. Further, when the user reads a mail or inputs characters, the user holds the communication terminal by hand so that the first operating part 105a and the first display part 112 are directed to a user side as shown in FIG. 5. At this time, even when the communication terminal is held by any of a right hand and a left hand, the speaker 107 is not covered with the hand. The user can clearly hear sound outputted from the speaker 107.

Further, as shown in FIG. 6, under the third opening state, the user holds the communication terminal so that the second operating part 105b and the first display part 112 are directed to the user side. In this case, when the first display part 112 is provided in the front part of the user, the user easily sees the display part. Thus, the user holds and uses the second casing member 101b by a right hand. At this time, the speaker 107 is not covered with the right hand. Accordingly, the user can clearly hear the sound outputted from the speaker 107.

Figure 15:
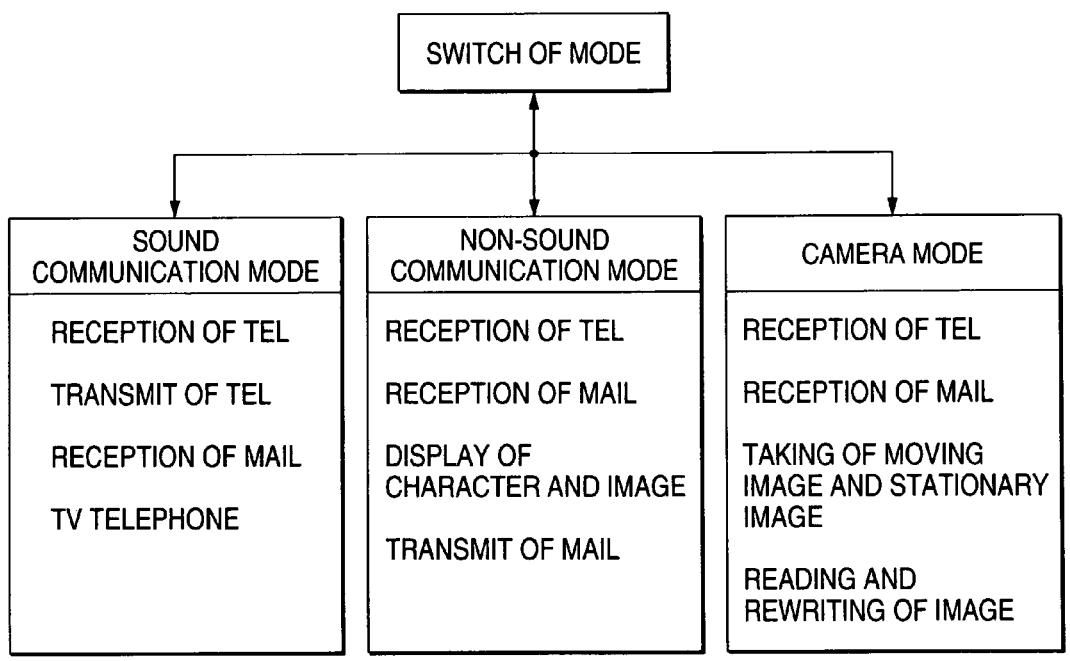
FIG. 15 is an explanatory view for explaining the functions of the communication terminal according to the embodiment.

Now, referring to FIGS. 1 to 15, an operation of the communication terminal of the embodiment will be described. FIG. 15 is an explanatory view for showing functions for respective modes of the communication terminal according to the embodiment. As shown in FIG. 15, when a power of the communication terminal of this embodiment is turned on, a sound communication mode is started. The operating part 105 is operated to switch a mode.

In a non-sound communication mode or a camera mode, each function can be operated.

In the sound communication mode, a receiving waiting operation of the sound and the non-sound communication is started. The user performs a sound receiving operation or a sound transmitting operation so that the user can talk with a mate. In a receiving waiting state, when the casing 101 is closed, time or the like is displayed on the second display part 113, and when the casing 101 is opened, time or the like is displayed on the first display part 112, respectively. When a call is received, the display of the time or the like disappears and the transmitting number of the mate is displayed. When the transmitting number of the mate is previously registered in a telephone directory together with a name, the name of the mate is displayed. Then, the operating part 105 is operated so that a talk can be started.

In the non-sound communication mode, while the receiving waiting state is maintained, character information inputted from the operating part 105 can be displayed on the first display part 112 and the character information or sound and non-sound information (an image or the like) stored in the information recording part 121 can be transmitted to the mate by using a transmitting function.

When the character information or the sound and non-sound information is received, if the casing 101 is opened, a message for informing the user of receiving the information is displayed on the first display part 112. When the casing 101 is closed, the message is displayed on the second display part 113, respectively. Further, the character information or image information can be displayed on the first and second display parts 112 and 113 in accordance with a prescribed operation by the user. When the sound or non-sound communication is carried out, a telephone directory function can be used to determine a mate to be transmitted. That is, the telephone directory function can be used to display the name of the mate on the first display part 112, select and determine the name of the mate.

In the camera mode, a photographing or recording operation by the camera part 109 can be carried out in the opening state. For instance, in the third opening state, when the user himself or herself in the first display part 112 side is photographed by the first camera part 109a, a mirror image is displayed on the display part 112. Accordingly, the user is present in a state the same as that when the user sees a mirror. When the user operates the second camera 109b to photograph a person (an object to be photographed) present in a front part, a mirror image is displayed on the second display part 113 and an inverted mirror image is displayed on the first display part 112. Thus, the person as the object to be photographed who is present in the front part can recognize in what manner he or she is photographed by watching the second display part 113. Further, the user who photographs the person watches a picked-up image displayed on the first display part 112, so that the user can recognize how the person is photographed.

When a photographing operation is started or finished, or a zoom function is used, a necessary operation can be carried out by using the second operating part 105b. When the user desires the picked-up image photographed by the user not to be seen by the person present in the front part, the user can operate the operating part 105 so that the picked-up image displayed on the second display part 113 in the third opening state can be set to non-display.

Further, the picked-up image photographed by the user can be recorded in the information recording part 121 as a stationary image or a moving image. When the moving image or the stationary image recorded in the information recording part 121 is reproduced, a prescribed operation is performed to display the picked up image on the first display part 112 and visually recognize the picked-up image. The picked-up image photographed by the user can be associated with telephone directory information and stored in a telephone directory. When a call is received from a telephone number associated with the image information, if the casing 101 is closed, the inverted mirror image of the of the picked-up image is displayed on the second display part 113. When the casing is opened, the inverted mirror image of the picked-up image is displayed on the first or the second display part 112 or 113. That is, the mirror image is displayed during a photographing operation, however, when the recorded image is read, the inverted mirror image is displayed. Further, the picked-up image photographed by the camera part 109 can be also transmitted to the mate to communicate with the user.

In any of the modes, when the call is received, a call receiving sound is outputted from the speaker 107 to inform the user of receiving the call. At this time, even when the casing 101 is closed, the call receiving sound outputted from the speaker 107 is guided outside the casing 101 through the clearance 123b between the first casing member 101a and the second casing member 10b. Thus, the user can clearly hear the call receiving sound. When the casing 101 is opened, the front part of the speaker 107 is opened, so that the user does not hardly hear the call receiving sound. Further, when a mode is set to a manner mode, the call receiving sound is not outputted and only the vibrator part 104 operates to vibrate the casing 101 for a prescribed time.

Now, the rotating operation of the casing 101 will be described below.

When the casing 101 in the closing state is opened, the first rotating shaft 125 rotates on its axis as a center in the hinge unit 138. At this time, the number of windings of the first winding part 139b of the flexible base 139 is reduced by a quantity corresponding the rotation of the first rotating shaft bearing 137 that rotates together with the first rotating shaft 125. Thus, bending stress generated in the flexible base 139 is also reduced. Since the cable 140 is disposed to substantially correspond to the axis of the first rotating shaft 125, the bending stress is not increased or decreased, and only torsion stress is generated. Further, when the casing 101 returns from the first opening state to the closing state, an operation from the closing state to the opening state is carried out in a reverse manner.

Further, when the first casing member 101a is rotated by 90 degrees in the direction S to become the third opening state from the second opening state, the number of windings of the second winding part 139c of the flexible base 149 is increased or decreased by a value corresponding to the rotation of the second rotating shaft 126. Since in the flexible base 139, only the number of windings is increased or decreased, only the bending stress is increased or decreased and the torsion stress is not generated. The cable 140 is wound on the second rotating shaft 126 by a quantity corresponding the rotation of the second rotating shaft 126. However, since the second rotating shaft 126 has a diameter smaller than that of the first rotating shaft 125, a radius of curvature when the cable 140 is wound on the second rotating shaft is also small. Thus, the generation of large bending stress can be avoided.

That is, the flexible base 139 forms the first and second winding parts 139b and 139c on the axes of the first and second rotating shafts 124 and 126 as the centers. Accordingly, even when the first and second rotating shafts 125 and 126 are rotated, the curvatures and the number of windings of the first and second winding parts 139b and 139c merely change. Therefore, when the rotating shafts are rotated, a pulling force or a bending force generated in the flexible base 139 is absorbed by the first and second winding parts 139b and 139c. Thus, only the bending force changes and the generation of the torsion stress is avoided.

When the casing 101 is closed and under the first opening and the second opening state, the head parts of the fastening screws 143b are opposed to the first casing member 101a, so that the fastening screws 143b are hidden by the first casing member 101a. Only when the casing 101 is rotated from the second opening state to the third opening state, the head parts of the fastening screws 143b are exposed. However, the head parts of the fastening screws 143b are exposed only in the case of the third opening state. Thus, an opportunity that the head parts of the fastening screws 143b are exposed can be reduced.

Further, in the third opening state, when a photographed moving image is watched or the communication terminal of this embodiment is used as a TV telephone, the user does not cover the speaker 107 with the hand. Thus, the user can clearly hear the sound reproduced from the speaker 107. Further, at the time of the TV telephone, the user does not cover the microphone 108 with the hand, so that the user can similarly clearly hear the voice of the mate to communicate with the user that is outputted from the speaker 107. The user can assuredly input the voice of the user to the microphone 108.

In this embodiment, the protrusion 123a for forming the clearance 123b between the first casing member 101a and the second casing member 101b when the casing 101 is located in the closing state is formed on the surface of the second casing member 101b. The same protrusion may be provided on other part such as the first casing member 101a. Other means may be used, for instance, a cover member for hiding the fastening screws 143a for fastening the first casing member 101a may protrude from the surface of the first casing member 101a. That is, even when the 101 is located in the closing state, to guide sound outputted from the speaker 107 outside the casing 101, the clearance 123b may be formed between the casing member on which the speaker 107 is provided and the casing member opposed thereto.

Figure 17:
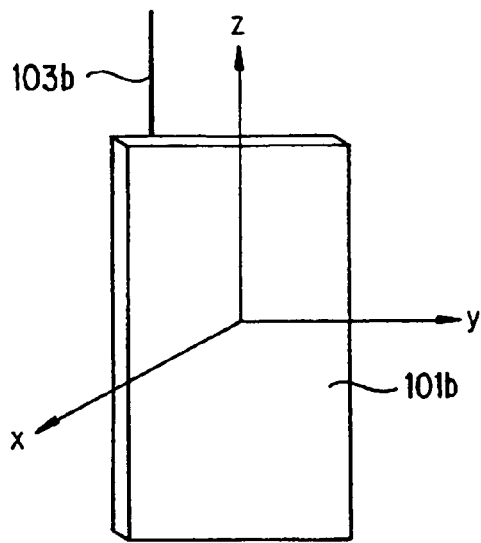
FIG. 17 is a characteristic view showing the directivity of the second antenna used in the communication terminal according to the embodiment, 17(a) being a diagram showing x, y and z axes relative to the casing, FIG. 17(b) showing a state that the casings are opened (the first and third opening states) and FIG. 17(c) showing a state that the casings are closed, respectively.
Figure 17:
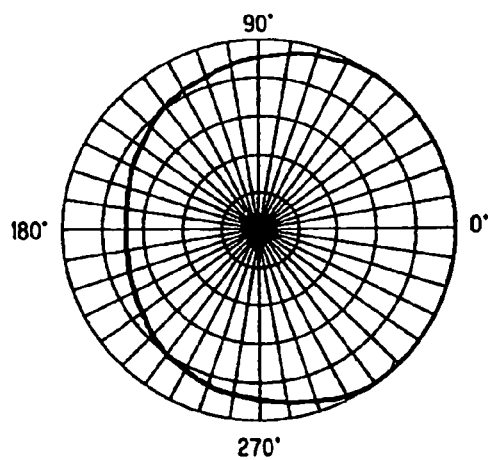
Figure 17:
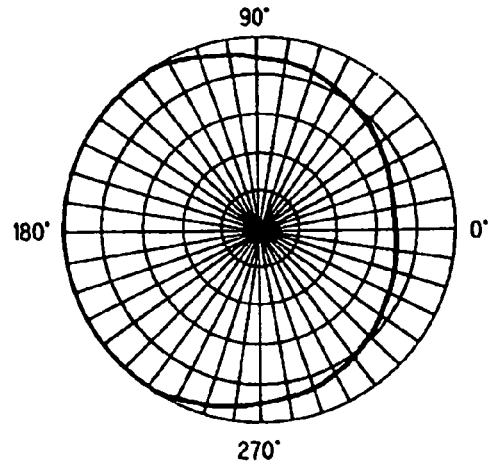

Now, an operation of the second antenna 103b will be described. FIG. 16 is an explanatory view showing a principle of the operation of the second antenna 103b used in the communication terminal according to the embodiment. FIG. 16(a) shows a closing state of the casings, FIG. 16(b) shows the first opening state and FIG. 16(c) shows the third opening state, respectively. FIG. 17 is a characteristic view showing the directivity of the second antenna 103b shown in FIG. 16. FIG. 17(a) is a diagram showing x, y and z axes relative to the casing, FIG. 17(b) shows a state that the casings are opened (the first and third opening states) and FIG. 17(c) shows a state that the casings are closed, respectively.

In FIG. 16, the first casing member 101a is connected to the second casing member 101b having the second antenna 103b by the capacity coupling (floating capacity) and insulated from the second casing member 101b in view of direct current. The casing member 101a serves as a reflector when the two casing members 101a and 101b are closed and serves as a director under the first opening state. In the closing state shown in FIG. 16(a), the directions of high frequency current (casing current) supplied respectively to the first and second casing members 101a and 101b are shown by arrow marks A and B and the volume thereof is larger in the second casing 101b side.

Further, in the first opening state shown in FIG. 16(b), the volume of the high frequency current supplied to the first casing member 101a is substantially the same as that of the high frequency current supplied to the second casing member 101b. However, the direction of the electric current has an opposite phase thereto. In this case, as shown by an arrow mark D, the direction in which the high frequency current flows is inverted to the arrow mark B. The direction of the high frequency current supplied to the second casing member 101b side shown by an arrow mark C is the same as that shown by the arrow mark A. Accordingly, in the first opening state, an electromagnetic wave is likewise radiated from the first casing member 101a side.

Further, in the third opening state shown in FIG. 16(c), the high frequency current (an arrow mark E) supplied to the second casing member 101b is the same as the high frequency current (the arrow mark A) supplied to the second casing member 101b under the closing state. As for the first casing member 101a, the first casing member 101a is located in a position where the first casing member 101a intersects the second casing member 101b. Thus, the first casing member 101a does not serve as the director and operates in the same manner as that in the closing state. Accordingly, the direction of the high frequency current (an arrow mark F) supplied to the first casing member 101a side substantially perpendicularly intersects the high frequency current (the arrow mark E) supplied to the second casing member 101b. That is, the casing current (the arrow mark F) of the first casing member 101a side does not cancel the casing current (the arrow mark E) of the second casing member 101b side. Therefore, the gain of the second antenna 103b is not lowered and the electromagnetic wave is radiated not only from the second casing 101b side, but also from the first casing member 101a side.

The second antenna 103b is provided along the first rotating shaft 125 of the hinge unit 138, however, the second antenna is not necessarily limited to this structure. For instance, the terminal end (an opposite side to the feeding part) of the second antenna may be extended in the direction separate from the hinge part 102, that is, in the direction toward a battery side (an end side of the second casing member 101b) from the hinge part 102. Further, the protruding antenna is provided in the vicinity of the hinge part. Even in this case, when the first casing member is loosely coupled to the second casing member, the deterioration of the gain of the antenna due to gripping by the hand of the user can be reduced, because the first casing member has an action as a radiator and an action of the director as described above. That is, the electromagnetic wave can be radiated from the first casing member side. Accordingly, the form of the antenna may be a plate shape or a rod shape.

Figure 18:
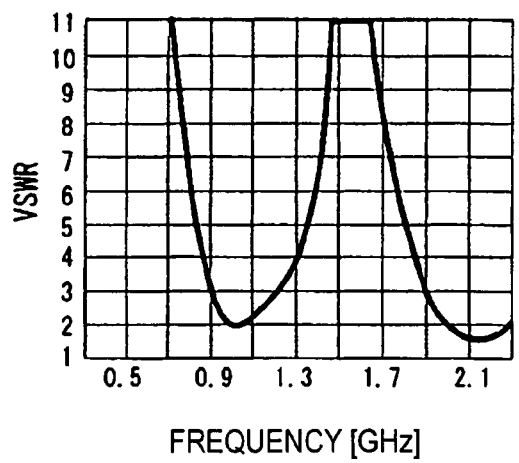
FIG. 18 is a characteristic view showing the VSWR characteristics and the impedance characteristics of the second antenna when the first and second casing members are tightly connected together, FIGS. 18(a) and 18(b) showing the closing states of the casing members and FIGS. 18(c) and 18(d) showing the first opening state, respectively.
Figure 18:
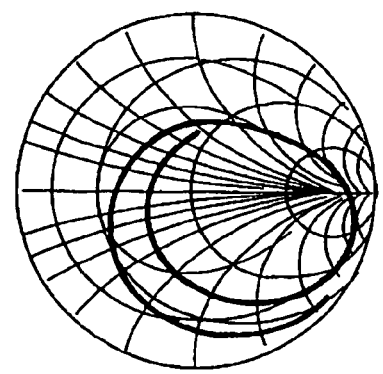
Figure 18:
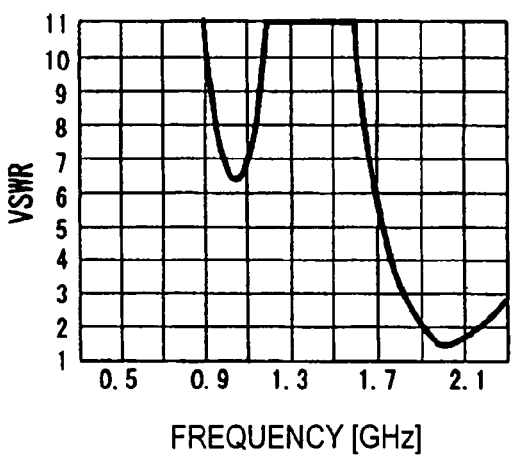
Figure 18:
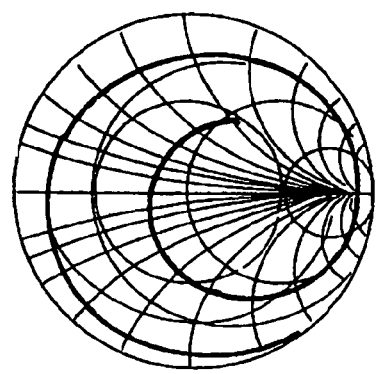

Now, referring to FIG. 18, the VSWR characteristics and impedance characteristics of the second antenna 103b when the first casing member is tightly coupled to the second casing member will be described. FIGS. 18(a) and 18(b) show the simulation results of the VSWR characteristics and the impedance characteristics under the closing state of the casing when the first and second casing members are tightly coupled to each other. FIGS. 18(c) and 18(d) show the simulation results of the VSWR characteristics and the impedance characteristics under the first opening state when the first and second casing members are tightly coupled to each other, respectively. The VSWR characteristic shown in FIGS. 18(a) and 18(c) under the two states when the casing members are tightly coupled to each other are compared with each other. As apparent from the drawings, when the casing 101 is moved from the closing state to the first opening state, the VSWR hardly changes in the vicinity of a 2 GHz band, however, the VSWR characteristics are deteriorated in a low frequency band side (near 0.9 GHz). This is caused from a reason why when the frequency is higher, the electric current supplied to the antenna is more increased and the casing current is decreased, and when the frequency is lower, the electric current supplied to the antenna is decreased and the casing current is more increased. The influence of the electric current of an opposite phase supplied to the first casing member 101a greatly contributes to the frequency of the low frequency band. As apparent from this result, especially when a multi-frequency antenna is used, the first casing member 101a is preferably loosely coupled to the second casing member 101b.

That is, when the first casing member 101a side is electrically tightly coupled to the second casing member 101b side, the radiation characteristics of a resonance frequency band in the low frequency band side are deteriorated. Accordingly, when the multi-frequency antenna is used, if the two casing members 101a and 101b are loosely coupled to each other, a better antenna gain can be obtained.

As shown in FIG. 5, under the first opening state, the user holds the second casing member 101b by hand to hold the receiver 106 of the first casing member 101a to his or her ear to talk with the mate. When the user uses the communication terminal as the TV telephone, the user employs the communication terminal by separating the first casing member 101a from a head part. When the user photographs the front part of the user, the user holds the second casing member 101b by hand under the second opening state. Accordingly, under the first opening state, the first casing member 101a that radiates the electromagnetic wave is not covered with the hand holding the casing member. Thus, the gain of the antenna can be avoided from decreasing and good transmitting and receiving operations can be performed. Under the third opening state, a side surface side in which the second antenna 103b of the second casing ember 101b is provided and the first casing member 101a are not covered with the hand, like the closing state, the deterioration of the gain due to holding by the hand can be reduced.

Further, in a case that the feeding part 103h in which the electric current reaches a maximum value is allowed to come near to the first winding part 139b of the flexible base 139, when the casing 101 changes from the closing state to the opening state, the curvature of the first winding part 139b changes to decrease a space between them. Thus, the capacity coupling of the flexible base 139 and the feeding part 103h of the second antenna 103b is caused. Consequently, the frequency characteristics of the low frequency band side indicate the radiation characteristics of a narrow band. Further, in a case that the feeding part 103h comes near to the flexible base 139, the electric current is supplied to the first casing member 101a side from a part just near the feeding part 103h. Accordingly, the casing current of the first casing member 101a side has an opposite phase to that of the casing current of the second casing member 101b side. As compared therewith, in this embodiment, the flexible base 139 is separated from the feeding part 103h and an end part (a terminal end of the second element part 103d) in which an antenna current reaches substantially zero is allowed to come near to the first winding part 139b. Accordingly, even when the casing 101 opens or closes, the capacity coupling of the first winding part 139b and the second antenna 103b is not caused. Thus, the narrow band can be prevented from being generated and the opposite phase of the casing current in the first casing member 101a side can be prevented from being formed. That is, the casing current can be controlled so that the casing current of the first casing member 101a side has the same phase as that of the second casing member 101b side. Accordingly, the gain of the second antenna 103b can be avoided from decreasing irrespective of the opening and closing states of the casing 101.

Figure 19:
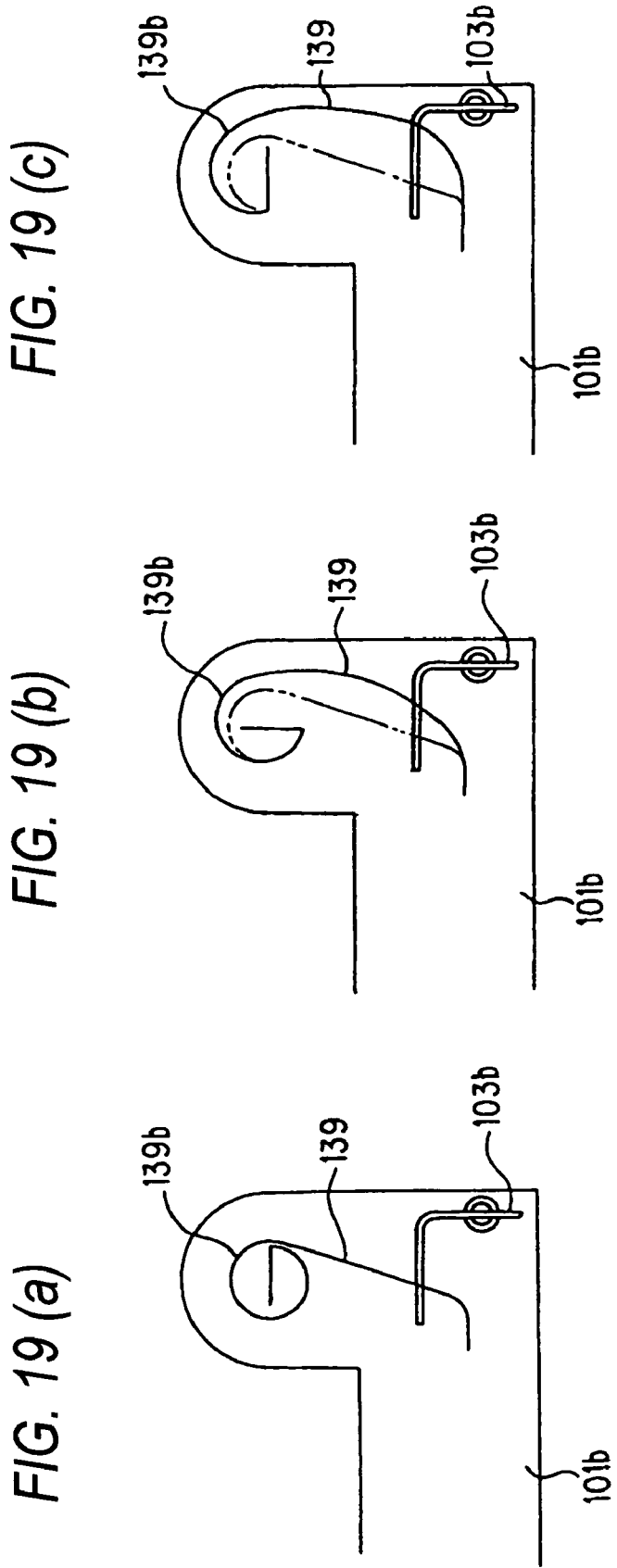
FIG. 19 is an explanatory view showing a degree of deformation of a flexible base in accordance with the opening and closing operations of the casing members forming the communication terminal of the embodiment, FIG. 19(a) showing a closing state of the casing members, FIG. 19(b) showing the third opening state and FIG. 19(c) showing the first opening state, respectively.
Figure 20:
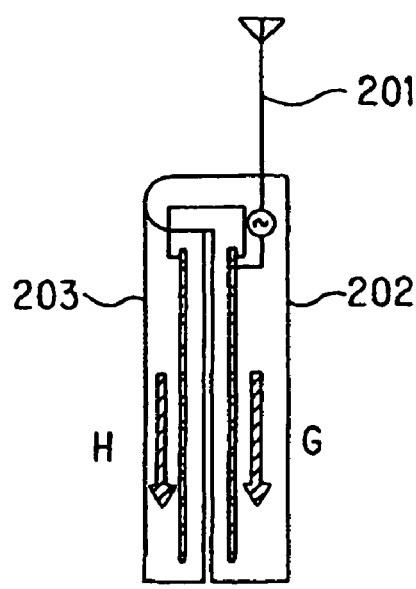
FIG. 20 is an explanatory view showing the structure of a usual communication terminal and a principle of the operation of an antenna, FIG. 20(a) showing a closing state of casing members and FIG. 20(b) showing an opening state of the casing members, respectively.
Figure 20:
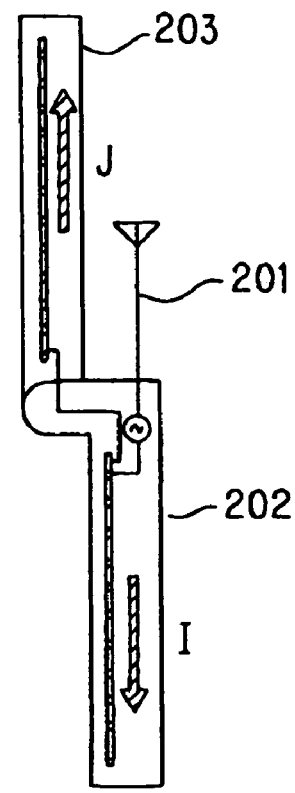
Figure 21:
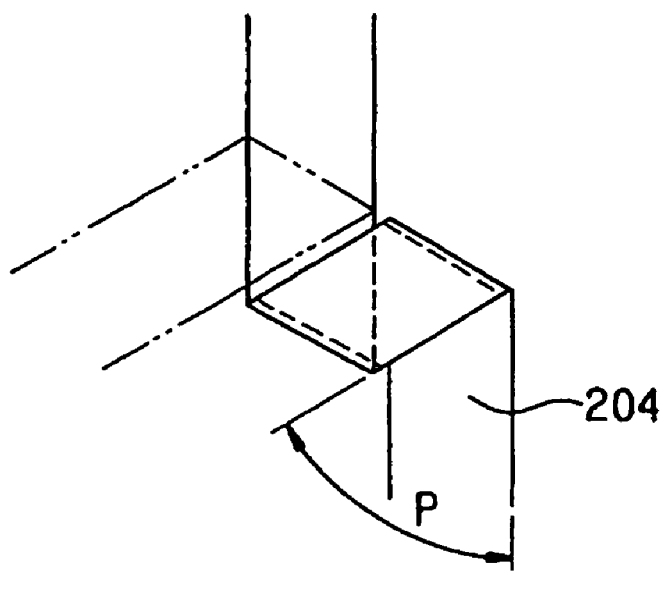
FIG. 21 is an explanatory view showing a deformation of a spirally wound flexible base provided in a usual communication terminal in accordance with the opening and closing operations of casing members.
Figure 21:
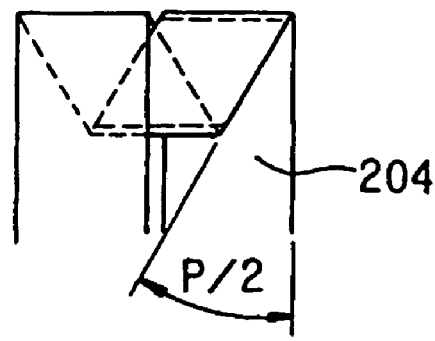

Now, referring to FIG. 19, the degree of the deformation of the flexible base 139 generated in accordance with the opening and closing operations of the casing 101 will be described below. FIG. 19(a) shows the closing state of the casing, FIG. 19(b) shows the third opening state and FIG. 19(c) shows the first opening state. In the closing state shown in FIG. 19(a), the flexible base 139 is provided substantially linearly downward from the first winding part 139b. In the third (or the second) opening state in which the casing 101 is opened by 90 degrees from the closing state as shown in FIG. 19(b), the number of windings of the first winding part 139b is decreased by ¾ round. Thus, the curvature of the first winding part 139b is increased and the flexible base 139 comes near to the second antenna 103b. In the first opening state shown in FIG. 19(c), the rate of change of the curvature of the first winding part 139b is more increased so that the flexible base 139 comes nearer to the second antenna 103b. Accordingly, when the casing 101 is changed from the closing state to the first opening state, the curvature of the first winding part 139b changes so that the configuration of the winding expands. Thus, the space between the flexible base 139 and the second antenna 103b is narrow to cause the deterioration of the gain of the second antenna 103b. Therefore, as in the above-described embodiment, a structure that the feeding part 103h is separated from the first winding part 139b is preferable to obtain a better antenna performance.

As described above, according to the embodiment of the invention, in the opening and closing type or collapsible communication terminal that has the flexible base inserted into the hinge part, even when the flexible conductor is disposed closely to the antenna, the deterioration of the gain of the antenna due to the flexible conductor can be avoided, because the flexible base is separated from the feeding part of the antenna. Thus, the deterioration of the gain of the antenna can be suppressed in any state of the opening and closing states. Further, in the opening and closing type communication terminal having the flexible base, the communication terminal can be provided in which the long life of the flexible base can be obtained and the antenna can be incorporated.

The present invention is described in detail with reference to the specific embodiment. However, it is to be understood to a person with ordinary skill in the art that various changes or modifications may be applied thereto without departing the spirit and the scope of the invention.

This application is based on Japanese Patent Application No. 2002-296520 filed on Oct. 9, 2002 and the contents thereof are incorporated herein as a reference.

INDUSTRIAL APPLICABILITY

As described above, according to the present invention, the communication terminal can be provided that can suppress the deterioration of the gain of the antenna can be suppressed in any state of opening and closing states.

The invention claimed is:

1. A communication terminal, comprising:
  a hinge part, which connects two casing members so as to freely open and close;

an antenna, which is provided near the hinge part in one casing member of the two casing members; and a flexible conductor, which connects conductive portions to each other, and the conductive portions being respectively provided in the two casing members, wherein the hinge part includes:

a first rotating member, which serves as an axis for rotating the two casing members in an opposed direction of the two casing members; and a second rotating member, which serves as an axis for rotating one casing member of the two casing members relative to the other casing member under a non-opposed state of the two casing member in a direction perpendicular to a rotating direction in which the first rotating member serves as the axis;

wherein the flexible conductor is disposed in one end side of the first rotating member; and wherein a feeding part of the antenna is disposed in the other end side of the first rotating member.

2. The communication terminal according to claim 1, wherein the flexible conductor is disposed along a vicinity of a center of axis of the first rotating member and a vicinity of a center of axis of the second rotating member;

wherein the flexible conductor is extended to the first casing member side through the one end side of the first rotating member; and wherein the flexible conductor is extended to the second casing member side through the other end side of the second rotating member.

3. The communication terminal according to claim 1, wherein at least one of the two casing members is insulated from the hinge part.

4. The communication terminal according to claim 1, wherein a winding part is formed on the flexible conductor disposed in the one end side of the first rotating member.

5. The communication terminal according to claim 4, further comprising a second flexible conductor which has a cable shape, the second flexible conductor connecting the conductive portions provided in the two casing members to each other; and wherein the second flexible conductor is inserted into the winding part.

6. The communication terminal according to claim 1, wherein the antenna is extended from the one end side to the other end side of the first rotating member.

7. The communication terminal according to claim 1, wherein the antenna has a first element part having a first electric length and a second element part having a second electric length;

wherein the one end sides of the first element part and the second element part are connected to each other by a reactance part having a reactance component; and wherein the other end side of one element part of the two element parts is connected to the feeding part.

8. The communication terminal according to claim 7, wherein the electric length of the first element part is set to ¼ times as long as the wavelength $\lambda 1$ of a first frequency; and wherein the electric length of the second element part is formed so that the sum of the electric length of the second element part and the electric length of the first element part is set to ¼ or ⅜ times as long as the wavelength $\lambda 2$ of a second frequency.

9. The communication terminal according to claim 1, wherein a receiving part and a transmitting part are provided in exposed surface sides of the two casing members which are exposed when the two casing members are changed from a closed state to a opened state; and wherein the antenna is disposed near the hinge part provided in a back surface side opposite to the exposed surfaces.

* * * * *